United States Patent
Pangrac et al.

(10) Patent No.: US 8,141,121 B2
(45) Date of Patent: Mar. 20, 2012

(54) METHOD AND SYSTEM FOR COMMUNICATING INFORMATION BETWEEN A POINT OF DISTRIBUTION AND A PLURALITY OF SUBSCRIBER DESTINATIONS VIA A HYBRID FIBER COAX DELIVERY PLANT

(76) Inventors: David M. Pangrac, Port Aransas, TX (US); Donald T. Gell, Port Aransas, TX (US); Steven W. Rose, Haliimaile, HI (US)

( * ) Notice: Subject to any disclaimer, the term of this patent is extended or adjusted under 35 U.S.C. 154(b) by 0 days.

(21) Appl. No.: 12/724,373

(22) Filed: Mar. 15, 2010

(65) Prior Publication Data

US 2010/0183306 A1    Jul. 22, 2010

Related U.S. Application Data

(63) Continuation of application No. 09/748,717, filed on Dec. 22, 2000, now abandoned.

(60) Provisional application No. 60/184,362, filed on Feb. 23, 2000.

(51) Int. Cl.
H04N 7/173        (2011.01)

(52) U.S. Cl. ........ 725/126; 725/105; 725/111; 725/116; 725/120

(58) Field of Classification Search .................. 725/105, 725/111, 116, 120, 126
See application file for complete search history.

(56) References Cited

U.S. PATENT DOCUMENTS

| | | | | |
|---|---|---|---|---|
| 4,533,948 A * | 8/1985 | McNamara et al. | .......... | 380/211 |
| 4,701,904 A * | 10/1987 | Darcie | .............. | 398/72 |
| 5,136,411 A * | 8/1992 | Paik et al. | ........... | 398/72 |
| 5,808,767 A * | 9/1998 | Williams et al. | ............ | 398/70 |
| 6,370,153 B1 * | 4/2002 | Eng | ................. | 370/438 |
| 6,408,436 B1 * | 6/2002 | de Haas | .............. | 725/86 |

* cited by examiner

Primary Examiner — Dominic D Saltarelli

(57) ABSTRACT

A communication system for distributing information via a network to one or more subscribers includes a multi-port switch, one or more radio frequency (RF) modems coupled to respective ports of the switch, a combiner and a transmitter. The switch forwards source information to the RF modems based on address information. Each RF modem modulates and up converts information from the switch to an RF signal within a respective subscriber channel of the television broadcast spectrum. Each channel is assigned to one or more subscribers, and each subscriber is allocated unshared bandwidth. The combiner combines modulated information from each RF modem into a combined signal and the transmitter transmits the combined signal to the subscribers via the network. Each subscriber destination includes a gateway device or the like that is tuned to a corresponding channel to retrieve source information from that channel, and to deliver the information to the subscriber.

20 Claims, 7 Drawing Sheets

METHOD AND SYSTEM FOR COMMUNICATING INFORMATION BETWEEN A POINT OF DISTRIBUTION AND A PLURALITY OF SUBSCRIBER DESTINATIONS VIA A HYBRID FIBER COAX DELIVERY PLANT

CROSS-REFERENCE TO RELATED APPLICATION(S)

The present application is a continuation of U.S. patent application Ser. No. 09/748,717, filed on Dec. 22, 2000, now abandoned entitled "System and method for distributing information via a communication network", which claims the benefit of the priority filing date of U.S. Provisional Patent Application No. 60/184,362, filed Feb. 23, 2000 entitled "Switched Ethernet Communication network Utilizing Hybrid Fiber Coax Delivery Plant", which is hereby incorporated herein by reference in its entirety.

FIELD OF THE INVENTION

The present invention relates to information delivery and distribution, and more particularly, to a system and method for allocating unshared, bidirectional and deterministic bandwidth to subscribers in a network.

DESCRIPTION OF RELATED ART

The demand for broadband content by business and residential subscribers is continually increasing. Broadband content includes multiple types of entertainment programming, communications and data, such as broadcast television channels, video on demand, streaming video, multimedia data, interne access, voice-over-IP, etc. To meet the increasing demand, it is necessary to increase bandwidth to each subscriber and to improve quality of service. Current delivery technologies include (1) several variations of DSL (digital subscriber line) technology, such as ADSL (asymmetrical DSL) and the like, which uses telephony technology, and (2) cable modem systems using television technology and HFC (hybrid fiber coax) distribution networks. The existing legacy technology for providing broadband content is becoming increasingly inadequate to meet the demand.

DSL technology is a method of delivering data over a twisted pair of copper wires or twisted pair cables, and typically uses the Public Switched Telephone Networks (PSTN). There are several major problems with provisioning video services over the existing PSTN and twisted pair cables (network plant). The existing network plant is not uniform and most of the plant is old with poor copper conditions that causes signal loss and line noise. In fact, ADSL cannot be provisioned for a large portion of the population over the existing plant because of significant distances to the closest switch and poor conditions of the existing plants. In addition, ADSL currently has a limited downstream bandwidth, and inherently provides a very limited return bandwidth. ADSL is not adequate for many types of content originating at a subscriber destination, such as video conferencing and the like because of its bandwidth limitations and characteristics.

Cable modem systems utilize the television broadcast spectrum and television technology to broadcast so-called broadband data to subscribers. One problem with delivery of broadband data (video on demand, streaming video, etc.) using existing HFC networks is the limitation on available delivery spectrum. The television data delivery systems have been established to deliver data to subscribers over a television broadcast spectrum extending from approximately 15 Megahertz (MHz) to approximately 860 MHz. Delivery of analog television downstream to the subscriber occupies the spectrum between approximately 54 MHz to 550 MHz, which leaves a relatively small range of spectrum for the delivery of digital data over HFC cable modem systems. The diplex filter separating the downstream from the upstream is currently located in the existing cable plant within the frequency range of approximately 42 to 54 MHz. Therefore, the two effective delivery frequency ranges using legacy HFC systems are those between approximately 15-42 MHz (upstream) and those between approximately 550-860 MHz (downstream).

Existing HFC cable networks are based on the Cable Modem Termination System (CTMS) and the Data-Over-Cable Service Interface Specifications (DOCSIS). These legacy systems use a shared frequency channel to broadcast all data to every downstream subscriber. The shared channel is generally 6 MHz wide providing a total data bandwidth of approximately 27-38 Mbps for digital information. The channel, however, is shared among many subscribers, so that the data rate varies dramatically depending upon the time of use and the number of subscribers simultaneously logged on. The quality of service is particularly low during popular usage time periods. An exemplary legacy system might distribute the shared channel among 4 separate nodes, each serving approximately 500 subscribers or more, so that resulting downstream data rate is often relatively low. The upstream shared channel is usually smaller, such as 3.2 MHz or less, and a "poll and grant" system is employed to identify data for upstream transmission. The resulting upstream performance is often no higher (and sometimes less) than a standard 56 Kbps modem.

It is desired to provide a system and method for distributing information via existing and future communication networks that meets the increasing demand for broadband content.

SUMMARY OF THE INVENTION

A communication system for distributing information via a network to subscriber destinations according to an embodiment of the present invention includes a multi-port switch, one or more radio frequency (RF) modems coupled to respective ports of the switch, a combiner and a transmitter. The switch forwards source, information for the subscriber destinations to the RF modems based on address information. Each RF modem operates to modulate and up convert information received from the switch for corresponding subscriber destinations to an RF signal within a respective subscriber channel of a television broadcast spectrum. Each subscriber channel is assigned to one or more of the subscriber destinations, and each subscriber destination is provided with an unshared bandwidth allocation. The combiner combines modulated information from each RF modem into a combined signal and the transmitter transmits the combined signal to the subscriber destinations via the network. Each subscriber destination includes a gateway device or the like that is tuned to a corresponding subscriber channel to retrieve source information from that channel. A significant benefit of the present invention is that each subscriber may be allocated an unshared, deterministic and bidirectional bandwidth.

The originator of the source information depends upon the particular network configuration. A point of distribution, such as a distribution hub or the like, is contemplated, which may be a headend or an originator of content including satellite receivers and associated equipment and the like, or which may be a communication or distribution hub coupled downstream from a headend facility. In this manner, one or more distribution points each serve a relatively large geographic area. The point of distribution may include one or more source servers coupled to the switch that provide content or source information for the subscriber destinations. The source servers may include, for example, a video server, a computer network server, a telephone network server, a utility server, etc., depending upon the desired services and content to be provided to the subscriber destinations. The source servers may also include an MPEG converter that provides converted broadcast video content to the subscriber destinations.

The source information may be implemented into any one of many different formats. For example, the source information may be in the form of fixed- or variable-sized packets, frames, or cells, each having address information indicative of an intended destination. The switch retrieves address information from the packets and forwards the packets based on the address information. The format of the source information may also depend upon the type of switch. For example, the switch may be an Ethernet switch operating at 100 megabits per second (Mbps), or a gigabit Ethernet switch operating at one gigabit per second (Gbps). Other types of switches are contemplated, such as an Asynchronous Transfer Mode (ATM) network switch operating with fixed-size cells.

The switch may also be implemented as a matrix of switches. In one embodiment, for example, the switch includes a switch matrix with arrays of switches organized as a pyramid configuration. The switch matrix includes a lowest level first array of switches and one or more higher level arrays of switches. Each first array switch is coupled to a subset of the RF modems, and each switch of each higher level array is coupled to a subset of switches of an adjacent lower level array. The first, lowest level array handles a relatively high level of bandwidth, a second array handles a medium level of bandwidth, and a third array handles a relatively low level of bandwidth. In a particular embodiment, the third array interfaces a telephone network server for handling telephonic data, the second array interfaces a computer network server and handles telephonic and computer network data, and the third array interfaces a video server and handles video, telephonic and computer network data. The switch matrix may be configured to operate significantly below its maximum bandwidth capacity to provide statistically starved capability. The switch matrix may further include a manager switch for handling management functions and subscriber to subscriber traffic. A bandwidth manager and/or address resolution server may be provided and coupled to the manager switch. The bandwidth manger allocates, monitors and tracks bandwidth usage. The address resolution server, in cooperation with gateway devices, enforces point to point type traffic in the network.

The network may include an optical plant, where the transmitter includes an optical transmitter that converts a combined electrical signal to an optical signal and that transmits the optical signal onto the optical plant. For upstream communications, an optical receiver is provided that that converts an optical upstream signal with subscriber information to a subscriber electrical signal. A splitter provides the subscriber electrical signal to one or more tuners, where each tuner extracts a corresponding subscriber RF signal. Also, one or more demodulators are provided, where each demodulator demodulates subscriber information from a corresponding subscriber RF signal and forwards the subscriber information to the switch.

The subscriber channels may extend over almost the entire portion of the television broadcast spectrum, which is an embodiment directed towards business applications or the like. In this case, the entire television broadcast spectrum is divided into an upstream portion and a downstream portion. Mid split or high split embodiments are contemplated, for example, in which the diplex filter is located at a higher frequency range to provide a more symmetric system with roughly equivalent down and up stream portions. Each subscriber channel includes a downstream subscriber channel in the downstream portion and an upstream subscriber channel in the upstream portion.

Alternatively, a broadcast television source is included which provides broadcast television information in a predetermined frequency range of the television broadcast spectrum, such as the frequency range 54-550 MHz or the like. In this case, the subscriber channels are allocated into a remaining portion of the television broadcast spectrum outside the frequency range allocated for broadcast television information. In a particular embodiment, for example, the subscriber channels include a downstream portion above the broadcast television frequency range and an upstream portion below the broadcast television frequency range. The combiner receives and combines the broadcast television information into the combined signal along with the subscriber channel information. Also, a video on demand (VOD) and modulator server may be provided that provides video information, where the combiner receives and combines the video information from the VOD and modulator server into the combined signal.

A bandwidth manager may be provided to allocate unshared bandwidth to each subscriber destination. Although an entire subscriber channel may be allocated to one subscriber, each subscriber channel may further be subdivided into multiple bandwidth increments. In a particular embodiment, for example, each subscriber channel has approximately 40 Mbps capacity, which is further divided into 5 Mbps unshared increments.

Each subscriber destination, therefore, may be allocated any multiple of 5 Mbps downstream bandwidth up to 40 Mbps for a given subscriber channel. In this manner, multiple subscriber destinations may be assigned to one subscriber channel. A static system is contemplated in which each subscriber destination is allocated a fixed amount of unshared bandwidth. Alternatively, a dynamic system is contemplated in which the bandwidth manager dynamically allocates additional bandwidth depending upon subscriber requests or needs. For example, the bandwidth manager detects a request by a subscriber destination for a service that requires a greater amount of bandwidth than the subscriber destination is currently allocated, and dynamically allocates additional unshared bandwidth to the requesting subscriber destination in order to handle the requested service.

The bandwidth manager is also useful for monitoring bandwidth usage of each of the subscriber destinations. This may be achieved by monitoring data flow through the switch, such as tracking data flow through the first array of the switch matrix between the switch and the subscriber destinations. The bandwidth manager may track overall bandwidth and may further track bandwidth usage based on service type. For example, the bandwidth manager tracks source information provided to each subscriber to determine service type allocation and usage. Such monitoring and tracking capabilities are useful for various purposes, such as billing subscribers based on actual service usage.

An address resolution server may be provided to reduce or eliminate subscriber broadcast traffic in the network. It is desired that broadcast traffic be substantially reduced to maintain sufficient bandwidth in the network to meet subscriber needs. In one configuration, for example, the address resolution server stores an address database that cross-references logical and physical addresses. The address resolution server is operative to respond to a physical address request by retrieving and forwarding the physical address based on a logical address. In one embodiment, for example, a gateway device is provided at each subscriber destination. A broadcast address resolution protocol (ARP) request submitted by a local subscriber device is captured by the gateway device and converted to unicast format. The unicast request is forwarded to the address resolution server, which retrieves the requested physical address and responds to the request. The requesting device is then able to communicate with the located device in the network on a direct and point to point basis. Thus, broadcast packets from subscriber destinations are avoided and broadcast traffic is substantially reduced. The address resolution server may be configured to forward a broadcast address resolution request in the event the physical address is not found in its local address database. In this latter embodiment, however, the address resolution server is further configured to detect and halt abuse of such capability. For example, the address resolution server detects a particular subscriber destination submitting more than a predetermined number of such requests with one or more unknown addresses, or detects a predetermined number of unsuccessful attempts by a subscriber destination in which the address is never located in the network. In either case, the subscriber destination's further requests are denied to prevent continued abuse.

In particular embodiments, each subscriber destination is provided with a gateway device or the like. The gateway device includes a tuner that is tuned to one or more assigned channels to extract modulated information, such as modulated information in an electrical signal delivered via a coaxial cable in a hybrid fiber coax (HFC) network. The gateway device further includes a demodulator that demodulates the extracted modulated information into the source information. The extracted source information is in digital format and many variations are contemplated depending upon the configuration at specific subscriber destinations. In one embodiment, the gateway device includes a gateway switch that that forwards source information to one or more subscriber devices based on address information in the source information. The gateway device may further include one or more converters that convert source information to an appropriate format for a corresponding subscriber device. For example, the gateway device may include a video converter that converts source video information into video data that is forwarded to a set top box. Digital video data may be converted into analog format for delivery directly to a television. The gateway device may include an audio converter that converts digital audio data into telephone analog signals that are provided to a local telephone. Of course, many other types of converters are contemplated.

The gateway device may further include management and control logic or the like that controls operations of the gateway device depending upon its configuration. In one embodiment, the management logic monitors bandwidth usage of the subscriber destination and forwards bandwidth usage information to the point of distribution. The bandwidth usage information may be aggregate information only or may further detail service type usage at the subscriber destination. As described previously, the point of distribution may include a bandwidth manager that receives and stores the bandwidth usage information. The distributed gateway device embodiment provides a more convenient mechanism to track bandwidth and/or service type usage and simplifies the bandwidth manager server configuration. The management and control logic may also be programmed or otherwise include logic to detect a physical address request in broadcast format from a local subscriber device, to convert the request to unicast format, and to forward the unicast physical address request to the point of distribution to reduce broadcast traffic as previously described.

The gateway device may further be programmable to be dynamically tuned to any assigned channel. A channel switch command or the like received from the point of distribution causes the tuner to switch from one channel to another. The command may be received directly by the tuner, or may be received by the management and control logic which controls or otherwise commands the tuner to perform dynamic channel switching. The gateway device may further include an optional buffer or the like that temporarily receives and stores data while the tuner is changing channels to facilitate seamless switching.

The gateway device also facilitates upstream traffic. In one embodiment, the gateway device includes a modulator that modulates subscriber information from a subscriber device and an up converter that converts modulated subscriber information to an RF signal into an assigned subscriber upstream channel. The up converter transmits the upstream RF signal to the point of distribution via the network, such as via coaxial cable to an optical transceiver node in an HFC configuration. The gateway device may further include one or more converters that convert the subscriber information into digital format before being provided to the modulator. A computer or set top box or the like may already include such conversion capability so that it would not be necessary in the gateway device. Other devices, such as analog telephones, televisions, security interfaces, utility interfaces, etc. may send data that requires conversion prior to modulation.

As described above, the combined signal delivered to subscriber destinations may include broadcast television information. In such embodiments, the gateway device may further include a splitter or the like that splits broadcast content from the combined signal. Depending upon its format, the broadcast content may be provided directly to a subscriber device, such as a set top box or television or the like, or may be converted, such as by a video converter or the like within the gateway device, before being provided to the subscriber device. Many other configurations and embodiments of the gateway devices are contemplated. For example, the tuner may be statically or dynamically programmable to switch to any other subscriber channels. For dynamic bandwidth allocation, for example, the bandwidth manager may be configured to remotely and dynamically re-tune the gateway device to a different subscriber channel. This dynamic tuning capability enables the bandwidth manager to dynamically move subscriber destinations to different subscriber channels to more efficiently utilize bandwidth and/or to dynamically increase bandwidth allocation to one or more subscriber destinations. A dynamically tunable gateway device may further include a buffer or the like to facilitate seamless switching. In the alternative or in addition, each gateway device may be tuned to multiple consecutive subscriber channels to maximize bandwidth allocation to any one or more subscriber destinations.

A communication system for enabling communication between a point of distribution and a plurality of subscriber destinations via an HFC network, according to embodiments of the present invention, includes an optical plant, a point of distribution, a coaxial cable distributed to one or more subscriber destinations and an optical transceiver node that interfaces the optical plant and the coaxial cable. The point of distribution includes a multi-port switch, one or more RF modems, a combiner and a transmitter that converts a combined signal to an optical signal and that transmits the optical signal via the optical plant. The optical transceiver node converts the optical signal to an electrical signal and transmits the electrical signal to the subscriber destinations via the coaxial cable. The optical transceiver node further includes an optical converter that converts a plurality of upstream RF signals from the coaxial cable into an upstream optical signal and that transmits the upstream optical signal to the point of distribution via the optical plant.

A communication system for distributing information via an optical network, according to the present invention, includes an optical plant, a point of distribution, one or more fiber optic cables each routed to a describer destination and a wavelength division multiplex (WDM) selector. The point of distribution includes a switch and optical transceivers and a WDM combiner that combines an optical source signal from each transceiver into a combined optical signal and that transmits the combined optical signal onto the optical plant. The WDM selector receives and separates the combined signal from the WDM combiner into its individual optical signal components and forwards each separate optical signal over a corresponding one of the fiber optic cables to a subscriber destination.

A method of distributing information by a point of distribution to subscribers via a communication network, according to embodiments of the present invention, includes dividing a television broadcast spectrum into one or more subscriber channels, each subscriber channel having a deterministic bandwidth, allocating unshared bandwidth to each subscriber destination, assigning each subscriber destination to a subscriber channel, forwarding source information to each subscriber destination based on assigned subscriber channels, modulating source information for each subscriber channel, up converting modulated source information into a corresponding subscriber channel, combining modulated information from each subscriber channel into a combined signal, and distributing the combined signal to the subscriber destinations via the communication network. The method contemplates many variations such as similar to the apparatus variations described above.

A method of communicating information between a point of distribution and one or more subscriber destinations via a hybrid fiber coax (HFC) delivery plant according to embodiments of the present invention includes the point of distribution dividing a television broadcast spectrum into one or more subscriber channels, each subscriber channel having a deterministic bandwidth, allocating unshared bandwidth to each of one or more subscriber destinations, assigning each subscriber destination to a subscriber channel, forwarding source information to each subscriber destination based on assigned subscriber channels, modulating source information for each subscriber channels, up converting modulated source information into a corresponding subscriber channel, combining modulated information from each subscriber channel into a combined signal, converting the combined signal into an optical signal, and transmitting the optical signal to an optical transceiver node via an optical plant. The method further includes an optical transceiver node converting the optical signal into a combined electrical signal, and transmitting the combined electrical signal via a coaxial cable to each of the subscriber destinations. Again, the method contemplates many variations such as similar to the apparatus variations described above.

BRIEF DESCRIPTION OF THE DRAWINGS

For a more complete understanding of the present invention, reference is now made to the following description taken in conjunction with the accompanying drawings in which like reference numerals indicate like features and wherein.

DETAILED DESCRIPTION OF EMBODIMENTS OF THE INVENTION

The present invention provides a system and method for delivering digital or analog information to subscribers via allocated, unshared, bi-directional and deterministic bandwidth over a network. The present invention increases available bandwidth to subscribers or otherwise improves quality of service by providing unshared and dedicated bandwidth rather than shared and non-deterministic bandwidth. The network may be implemented in any desired manner, such as a hybrid fiber coax (HFC) network, an all-optical fiber network, etc.

The HFC network is a wired, two-way communication network based on radio frequency signals of the type received by television receivers. The HFC network uses linear fiber optics to transmit signals from a cable headend or distribution hub to an optical transceiver node close to subscriber destinations. A conventional coaxial transmission line bus structure may be used, usually with inexpensive radio frequency (RF) amplifiers as needed to cover the distance between the optical transceiver and subscriber's home. Individual subscribers are connected to the coaxial bus using coaxial line drops tapped from the cable to provide individual end-user network connections. Upstream and downstream signals reside on the same coaxial cable, separated in frequency. The optical transceiver node includes an optical converter that asserts the composite upstream signals from subscribers to the cable headend or distribution hub via the optical plant. The optical plant may be a single cable or separate upstream and downstream cables depending upon the optical mode of transmission.

Figure 1:
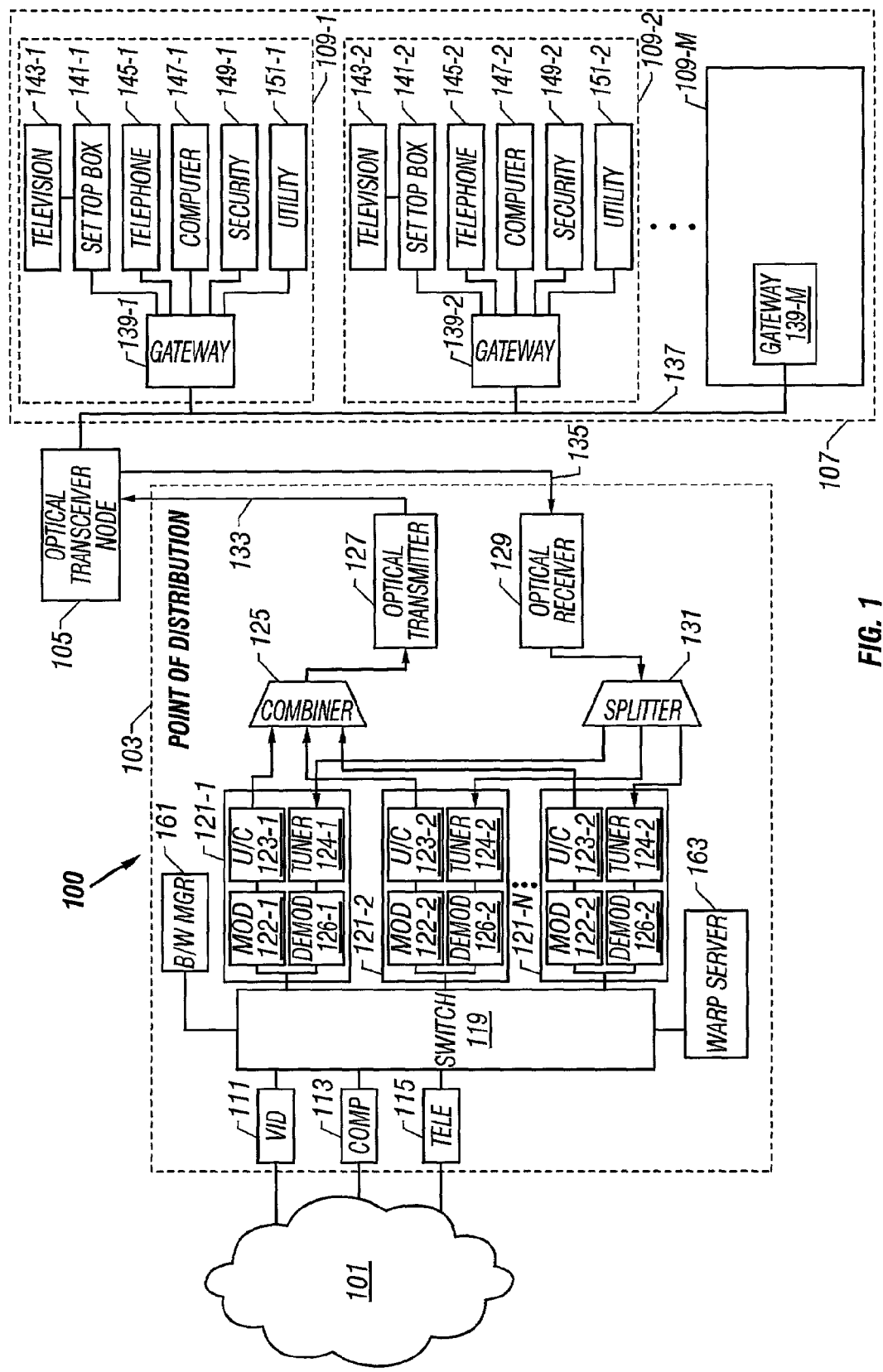
FIG. 1 is a block diagram of a communication network according to an exemplary embodiment of the present invention including a switched hierarchy and assigned subscriber channels.

FIG. 1 is a block diagram of a communication system 100 implemented according to an exemplary embodiment of the present invention. The communication system 100 receives information from a source 101 and delivers the source information to one or more subscriber destinations 109 via a point of distribution 103 and a hybrid fiber coax (HFC) distribution network. The source information includes video, audio, data signals and the like, which may be in any of many different formats. In exemplary embodiments, the source information is converted to and/or delivered in frames or packets, such as internet protocol (IP) packets or Ethernet packets or the like, although other digital formats are contemplated including fixed size frames or cells, such as used by the Asynchronous Transfer Mode (ATM) network technology. Any type of digital information in fixed- or variable-sized frames, packets or cells is referred to herein as "packetized" data. The packetized data includes one or more destination addresses or the like indicating any one or more of the subscriber destinations 109 or indicating specific subscriber devices at the subscriber destinations 109. The point of distribution 103 may be a headend or originator of content, such as including satellite receivers and associated equipment and the like, or may comprise a downstream communication or distribution hub coupled to a headend facility. Thus, there may be one or more points of distribution 103 serving a relatively large geographic area.

The source 101 incorporates or otherwise represents any one or more electronic communication networks or devices, such as the internet, the public switched telephone network (PSTN), satellite communications, etc., and may represent or otherwise include a headend facility. The point of distribution 103 is coupled to the source 101 through one or more content server computers that convert or otherwise deliver data and content between the point of distribution 103 and the source 101. For example, the point of distribution 103 may include one or more video servers (VID) 111 that communicate video content, one or more computer network servers (COMP) 113 that enable communication with the internet or other computer networks, and one or more telephone network servers 115 that enable communication with the PSTN or other telephonic network. The illustrated servers 111-115 are exemplary only and other types of servers and content are contemplated. Each of the servers 111-115 represents one or more server computers and includes any additional functionality as necessary or desired. For example, the VID servers 111 may incorporate one or more video functions including video-on-demand (VOD) and may further include an MPEG converter or the like that converts broadcast video content from analog to digital or otherwise transcodes video content from one digital form to another. The telephone network servers 115 may include or otherwise incorporate one or more telephone switches or the like.

The point of distribution 103 farther includes a switch 119 coupled to the servers 111 115 and further coupled to a number (N) of radio frequency (RF) modems 121 via corresponding ports of the switch 119. The RF modems 121 are individually referenced as 121-X, where "X" is a positive integer from 1 to N and where "N" is a positive integer greater than one. Each server 111-115 converts or translates information into packetized format for communication with the switch 119. In one embodiment, the switch 119 is an Ethernet-type switch that forwards Ethernet packets between the servers 111-115 and the RF modems 121. Each data packet includes source and destination addresses enabling the switch 119 to forward the packets from a source to the appropriate destination. For example, the switch 119 retrieves addresses from data packets from each server and forwards the packets to one of the RF modems 121 based on the addresses. Likewise, the switch 119 forwards subscriber and other packetized information from the RF modems 121 to the servers 111-115 for delivery to the source 101. In more particular embodiments, the switch 119 includes one or more 100 BaseT Fast Ethernet switches that operate at a data rate of 100 Mbps, or one or more 1000 BaseT Gigabit Ethernet switches that operate at 1 gigabit per second (Gbps). It is understood that the present invention is not limited to any particular switch technology and that other network architectures and technologies may be used, such as Asynchronous Transfer Mode (ATM) switches and the like.

Each RF modem 121 includes a modulator (MOD) 122 coupled to an up converter (U/C) 123 and a tuner 124 coupled to a demodulator (DEMOD) 126, which are devices known to those having skill in the art. The modulator 122, the up converter 123, the demodulator and the tuner 124 of each RF modem 121 may be incorporated into a single component or may be implemented into any number of separate components. Although only three RF modems 121-X are shown, it is understood that the communication system 100 is scalable so that any number of RF modems 121 may be employed as indicated by the designation N.

The source information from the switch 119 is modulated by each modulator 122 of each RF modem 121 into an intermediate frequency (IF). The corresponding up converter 123 then up converts a corresponding IF signal into one of multiple RF channels of the television broadcast spectrum, where each channel has a predetermined bandwidth. The particular frequencies employed by each modulator 122 and up converter 123 depends on the particular configuration. In one embodiment, for example, each modulator 122 is configured to separately modulate to within approximately the same intermediate frequency range, such as a selected frequency between 1-60 MHz. Each corresponding up converter 123 then converts by a different frequency level to change the IF signal into a desired RF frequency channel assigned to that RF modem 121. In this first case, each up converter 123 employs a different carrier frequency, separated by a predetermined frequency channel width, to enable separation of the assigned channels in the RF spectrum. In an alternative embodiment, each modulator 122 modulates the source information into a respective one of a plurality of different IF signals, each separated by a predetermined frequency channel width. Each up converter 123 then up converts by approximately the same frequency level, so that the IF signals are up converted into an assigned RF channel of a corresponding RF modem 121.

The RF signals from each of the RF modems 121 are then provided to respective inputs of a combiner 125, which combines the RF signals from the RF modems 121 into a single combined electrical signal that is provided to an optical transmitter 127. The combiner 125 essentially aggregates the RF signals from each of the assigned channels into an aggregate electrical signal for bulk transmission. The optical transmitter 127 converts the combined electrical signal to optical signals by a laser and transmits the optical signals via a fiber optic cable 133 to an optical transceiver node 105. It is noted that the point of distribution 103 may transmit to more than one optical transceiver node, each similar to the node 105 and that serves a different geographic serving area. The node 105 receives the optical signal and converts it back to a replica of the combined electrical signal and distributes the combined electrical signal over a coaxial cable 137 to each of several subscriber destinations 109 of a geographic serving area 107.

Figure 6:
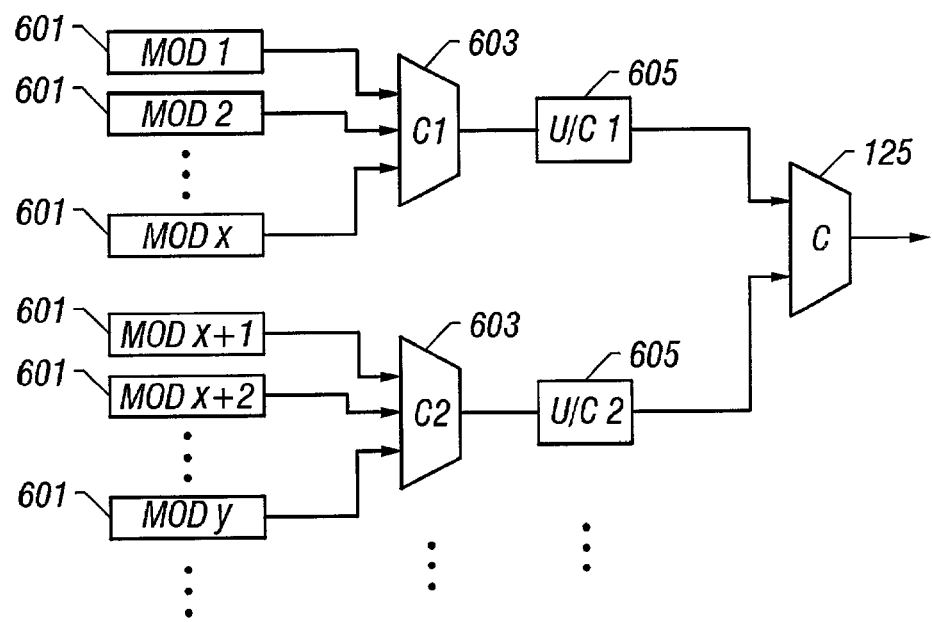
FIG. 6 is a block diagram of an alternative embodiment of a portion of the RF modems of FIG. 1 for reducing the number of up converters at the point of distribution.

FIG. 6 is a block diagram of an alternative embodiment of a portion of the RF modems 121 for reducing the number of up converters at the point of distribution 103. An array of RF modems (MOD) 601 is shown in groups (a first group including MOD 1 to x, a second group including MOD x+1 to y, etc.), where each RF modem 601 is similar to the RF modems 121 except excluding the up converter 123. The modulated IF signal from each of the RF modems 601 are provided to respective inputs of one or more combiners 603, individually shown as C1, C2, etc., where the output of each combiner 603 provides a combined intermediate signal. The outputs of each of the combiners 603 are provided to a corresponding up converter 605, individually shown as U/C 1, U/C 2, etc., where each up converter 605 converts a corresponding IF signal by appropriate one or more frequencies to provide a combined RF signals into the desired channels. The output of each up converter 605 is then provided to a respective input of the combiner 125 to provide a combined electrical signal in a similar manner as previously described. The configuration shown in FIG. 6 illustrates an alternative embodiment in which one or more of the up converters 123, which are often the more expensive component, are combined into a single up converter 603 for improved efficiency and reduced cost.

Referring back to FIG. 1, the geographic serving area 107 includes M subscriber destinations 109 (individually referenced as 109-X, where "X" is a positive integer from 1 to M and where "M" is a positive integer greater than one). In one embodiment, the number M of subscriber destinations 109 may be maintained at a predetermined maximum and/or the distance traversed by the coaxial cable 137 is limited to a predetermined maximum distance, such as a substantially reduced distance as compared to conventional cable configurations. Such maximum values are chosen to reduce line losses across the coaxial cable 137 to a level that is not significant enough to effect network performance. In one embodiment, for example, a maximum distance of one thousand feet and a maximum number of 150 subscriber destinations 109 is maintained for each geographic serving area. This architecture eliminates the need for amplifiers as required by legacy cable systems. Further, the noise level on the network including the coaxial cable 137 is substantially reduced, thereby improving communications, particularly upstream communications. A reduced number of subscriber destinations 109 provide greater bandwidth per subscriber, which is particularly advantageous to increase the bandwidth for upstream communications. Also, the complexity or sophistication of the communication equipment, such as at each node 105, is reduced, thereby reducing cost of the equipment and cost of maintenance of the equipment over time. It is understood, however, that the communication system 100 provides many advantages regardless of specified distances, the number of subscribers or the use of amplifiers. The present invention contemplates technologies that enable increased distance and/or number of houses that can be serviced without using amplifiers. Also, although only one geographic serving area 107 is shown, the point of distribution 103 may interface multiple optical transceiver nodes, each node serving a different geographic serving area.

The N RF modems 121 collectively service the M subscriber destinations 109 of the geographic serving area 107 via the optical transceiver node 105. Of course, the point of distribution 103 may include additional RF modems 121, combiners 125 and optical transmitters 127 to service additional geographic service areas via corresponding optical nodes 105 depending upon particular cable configurations. In one embodiment, N and M are chosen to be equal to provide a one to one correspondence between the RF modems 121 and the subscriber destinations 109. In this embodiment, each subscriber destination 109 is allocated the entire bandwidth provided by a corresponding one of the RF modems 121.

It is noted that it is not necessary or even desirable that the number of RF modems 121 be equal to the number of subscriber destinations 109. The amount of bandwidth provided by each RF modem 121 may exceed the bandwidth requirements of any two or more subscriber destinations 109. Also, the bandwidth provided by each of the RF modems 121 is divisible to serve two or more subscriber destinations 109. In a particular embodiment, for example, each RF modem 121 is configured to provide a downstream bandwidth of approximately 40 Mbps, which may further be allocated into 5 Mbps bandwidth increments at any given time. Thus, each RF modem 121 may serve up to 8 different subscriber destinations 109, each with 5 Mbps of downstream bandwidth. In more practical configurations, therefore, M is significantly greater than N to maximize usage of the RF modems 121. It is further noted that additional or "reserve" RF modems may be provided to provide a more robust system. In the event of failure of an operational RF modem, a reserve RF modem is activated to replace the failed RF modem 121. In one embodiment, each of the RF modems 121 may be fixed to a particular channel of operation. In a more practical embodiment, each RF modem 121 is programmable to operate in any of the channels for greater flexibility.

In any of these embodiments and as described more fully below, a dedicated and unshared data pathway is established between the point of distribution 103 and each subscriber destination 109 so that each subscriber has allocated, unshared, bidirectional and deterministic bandwidth. In one embodiment, the amount of bandwidth available to any given subscriber 109 is programmable to meet that particular subscriber's bandwidth needs. For example, a subscriber signs up for and is granted a selected one of multiple bandwidth allocations, where the selected bandwidth allocation is always available to the subscriber destination regardless of actual usage by that subscriber or any other subscriber. In more flexible configurations, the bandwidth allocation is dynamically configurable and may be modified based on the subscriber's needs or requests on the fly or when requested. For example, regardless of an initial bandwidth allocation granted to a subscriber (e.g. 10 Mbps), that subscriber may temporarily request a greater amount of bandwidth (e.g. 20 Mbps) for a particular application, such as a video conference or the like.

Each of the subscriber destinations 109 includes a corresponding gateway 139, where each gateway 139 is coupled to the coaxial cable 137 and tuned to one or more channels established by the RF modems 121. The gateways 139 are individually referenced as 139-X, again where "X" is a positive integer from 1 to M. In this manner, the combined electrical signal from the node 105 is received via the coaxial cable 137 by each gateway 139 of the geographic serving area 107. Each gateway 139 is further coupled to one or more additional subscriber devices, such as a set top box 141, a telephone 145, a computer 147, a security interface 149 and a remote utility interface 151. The television 143 is coupled to the set top box 141. It is understood that the listed and shown subscriber devices are exemplary only, where each subscriber destination 109 may include any number, more or less, of subscriber devices other than that illustrated. Also, each gateway 139 may be configured to forward data to any other type of subscriber device (not shown) that is configured to process the received data.

Figure 7:
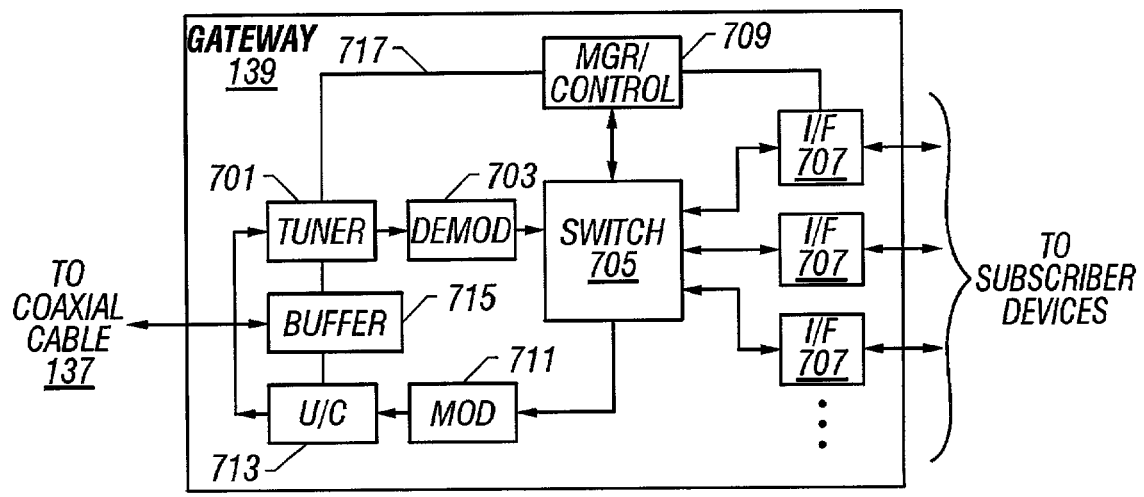
FIG. 7 is a block diagram of an exemplary embodiment of the gateways of FIG. 1.

FIG. 7 is a block diagram of an exemplary embodiment of the gateways 139. Each gateway 139 includes a tuner 701 that is tuned to at least one channel of the combined electrical signal on the coaxial cable 137. In one embodiment, for example, each gateway 139 is tuned to a corresponding downstream channel of the television broadcast spectrum, such as a corresponding 6 MHz channel modulated by a corresponding RF modem 121. Each gateway 139 also includes a demodulator 703 that extracts the source information in the form of packetized data from the assigned channel. Each gateway 139 further includes a multi-port switch 705 or the like that forwards extracted source information to one of the subscriber devices, including the set top box 141, the telephone 145, the computer 147, the security interface 149 or the utility interface 151, through corresponding (and optional) interface (IN) modules 707 coupled between ports of the switch 705 and the input/output (I/O) connectors of the gateway 139. The switch 705 selectively forwards the packetized source information based on addressing information within the packets, such as a MAC physical address or an IP address or the like. Since a given channel may include source information intended for multiple subscriber destinations 109, the switch 705 drops or discards packets with an address that is not recognized or otherwise intended for a different subscriber destination 109. Each interface module 707 includes any necessary converters or the like to enable communication between the switch 705 and the particular subscriber device connected thereto.

The tuner 701 of each gateway 139 may be implemented in any one of several different manners depending upon the particular operation and network configuration desired. In one embodiment, the tuner 701 is effectively assigned and tuned to a corresponding downstream channel, which is enabled by one of the RF modems 121. The tuner 701 effectively extracts all of the source information from an associated RF modem 121, regardless of whether the information is intended for the corresponding subscriber destination 109. The switch 705 filters and drops source information not intended for that subscriber destination 109. Of course, the subscriber destination 109 may be allocated the entire bandwidth of a channel provided by a corresponding RF modem 121.

In another embodiment, each tuner 701 is programmable and may be dynamically tuned to any other channel. Such dynamic tuning is advantageous for various reasons, including the ability to switch to a second RF modem 121 in the event of failure of a first. Another benefit of dynamic tuning is the ability to switch to a different channel and RF modem 121 in the event of a change in bandwidth allocation and/or to increase available bandwidth utilization. For example, a subscriber destination 109 may request increased bandwidth that is not available from its current RF modem 121 that is also serving one or more additional subscriber destinations 109. Dynamic tuning enables the tuner 701 to be switched to a different RF modem 121 that has sufficient bandwidth to handle the requested bandwidth. Also, one or more subscriber destinations 109 utilizing lower bandwidth may be moved or repositioned to free up one or more RF modems 121 to provide greater bandwidth to one or more other subscriber destinations 109. Additional buffering may be provided within each gateway 139 to facilitate seamless switching from one RF modem to another. In yet another embodiment, each tuner 701 may further be capable of tuning to multiple consecutive channels, which effectively multiplies the available bandwidth to the corresponding subscriber destination 109. For example, in a configuration with 6 MHz channels, a tuner 701 may be configured to tune to incorporate up to five or more channels to retrieve up to 30 MHz or more, which corresponds to up to 200 Mbps or more potential bandwidth at a single location.

Each gateway 139 also contains a processor, additional software, firmware or the like, collectively shown as manager/control block 709 coupled to another port of the switch 705, to control its operation and each of the interface modules 707 associated with each of the other subscriber devices. The manager/control block 709 may also be coupled directly to one or more of the interface modules 707. The software may be programmed to control one subscriber device when a different subscriber device receives a signal (e.g., turning down the volume of the subscriber's television set when a telephone call is received). In one embodiment, each gateway 139 forwards digital data directly to the corresponding telephone 145, which includes conversion circuitry to convert the digital signals to the necessary format for enabling telephonic communications. In another embodiment, one of the interface modules 707 includes a converter that converts telephonic digital information to plain old telephone service (POTS) analog signals for consumption by the telephone 145 coupled to that interface module 707, and for converting POTS signals from the telephone 145 to digital signals for transmission back to the point of distribution 103.

Each gateway 139 provides the benefit of allowing the provisioning of the additional services, such as the telephone, security, utility and computer services, which are likely to be located at different physical locations in the subscriber's home. Thus, each gateway 139 forwards source information to the appropriate or addressed subscriber device in the subscriber's home. Additionally, each gateway 139 allows the subscriber destination 109 to send subscriber information upstream to the point of distribution 103 (e.g., utility meter data). Each gateway 139 provides another advantage in that it may be installed outside of the subscriber's house. This allows each gateway 139 and its data signals to be insulated from the RF noise and interference occurring in the subscriber's home and further facilitates tapping into the various other receiving devices in the subscriber's home.

The electrical RF signal on the coaxial cable 137 includes a point-to-point RF data signal within the assigned channel for each gateway 139. The RF data signal may be transmitted either based on a specific subscriber request (e.g., a request for television content or Internet content) or based on a standing subscriber request (e.g., all telephone data addressed to a subscriber's telephone number). For example, the set top box 141-1 converts television broadcast digital information into analog signals for consumption by a corresponding television 143-1. Movie-type data packets are sent to an MPEG decoder in the set top box 141-1 for decoding from data to video for display on television 143-1. Internet or Ethernet type data packets are sent to the computer 147-1. In a similar manner, telephonic information is forwarded to the telephone 145-1, security information is forwarded to the security interface 149-1, and utility information is forwarded to the utility interface 151-1. It is noted that many variations of the particular embodiment shown are contemplated. For example, the gateway 139 and its corresponding functions provided at any one or more of the subscriber destinations 109 may be incorporated into one of the subscriber devices, such as the set top box 141, or may be incorporated into a different subscriber device, such as a cable modem or the like.

The communication system 100 also includes a return or "upstream" data path from the subscriber destinations 109 to the point of distribution 103. As shown in FIG. 7, each gateway 139 also includes a modulator 711, coupled to a port of the switch 705, that modulates subscriber information received from any of the subscriber devices 141, 143, 145, 147, 147 or 151 (141-151) into an IF signal. An up converter 713 is coupled to the modulator 711, where the up converter 713 up converts the modulated IF signal from the modulator 711 into an RF signal in an upstream channel. The up converter 713 asserts a return or subscriber or "upstream" RF signal onto the coaxial cable 137. The data signal is thus converted by the gateway 139 to an RF signal and placed within an upstream channel by the gateway modem and up converter.

As described previously, the tuner 701 may be programmable so that it be dynamically tuned to any other channel handled by a different RF modem 121. As described more fully below, a channel switch command is sent by the point of distribution 103 to the gateway 139 indicating a new channel. The channel switch command is received directly by the tuner 701, which then performs the channel switch in response. Alternatively, the command is forwarded to the manager/control block 709, which then commands or otherwise controls the tuner 701 to perform the channel switch via a control link 717 or the like. An optional buffer 715 is provided and coupled to the tuner 701, to the up converter 713 and to the coaxial cable 137 to temporarily receive and store data while the tuner 701 switched to facilitate seamless switching.

Referring back to FIG. 1, the upstream RF signals from each of the subscriber destinations 109 are transmitted on the coaxial cable 137 back to the node 105. A separate upstream channel of the upstream portion of the television broadcast spectrum may be assigned to each of the subscriber destinations 109 to prevent interference with downstream communications. The upstream RF signals are provided to the node 105, which includes an upstream optical transceiver that converts the subscriber RF signals to an optical signal. A laser in the node 105 is used to convert the return signal to an optical signal and send the optical return signal to an optical receiver 129 at the point of distribution 103 over another fiber optic cable 135. It is noted that the optic cables 133, 135 may comprise a single cable or optic plant depending upon the particular configuration. The optical receiver 129 converts the combined optical signal to a combined subscriber electrical signal, which is provided to a splitter 131. The splitter 131 duplicates and forwards the combined subscriber electrical signal to a respective tuner 124 of each of the RF modems 121. Each tuner 124-X is tuned to one or more upstream channels assigned to that particular RF modem 121, and extracts a corresponding return RF signal. Each tuner 124 provides the extracted return RF signal to a corresponding demodulator 126-X, which demodulates the return RF signal into the corresponding subscriber data packets sent from one or more of the subscriber destinations 109 associated with that RF modem 121. The subscriber information data packets are then forwarded to the switch 119 for processing and forwarding.

It is noted that many different modulating frequencies and techniques are contemplated for both downstream and upstream communications. Modulation techniques may include, for example, Frequency Shift Keying (FSK), Quadrature Phase-Shift Keying (QPSK), as well various types of Quadrature Amplitude Modulation (QAM), such as QAM 16, QAM 64, QAM 256, etc., among other modulation techniques. Also, each channel may have any predetermined bandwidth, such as 3 MHz, 6 MHz, 12 MHz, etc. Each channel typically includes a separate downstream and upstream channel separated in frequency, where the corresponding down and up stream channels may have the same or different channel width. Further, the modulation technique employed for each downstream channel may be the same or different than the modulation technique employed for each upstream channel. A simpler modulation technique employed for upstream communications enables a simpler and less expensive gateway or cable modem design at each subscriber destination 109. In an exemplary embodiment, for example, each channel includes a 6 MHz downstream channel and a 2 MHz upstream channel. Using QAM 256 modulation for the downstream 6 MHz channel (at approximately 5.36 usable MHz) enables a raw data rate of approximately 42 Mbps. Using QAM 64 modulation for the upstream 2 MHz channel (at approximately 1.8 usable MHz) enables a raw data rate of approximately 11 Mbps per subscriber destination 109.

Of course, many different variations and alternatives are possible and contemplated without departing from the scope of the present invention. In one embodiment, the downstream bandwidth allocations are greater than the upstream bandwidth allocations. Alternatively, the down and up stream allocations are equal or substantially equivalent to achieve a symmetrical configuration. Of course, if the communication system 100 is configured with dynamic bandwidth allocation, bandwidth allocations may be modified based on subscriber needs.

In an exemplary high split system configuration, the available RF spectrum of 5-860 MHz is divided into an upstream range of 5-188 MHz and a downstream range of 238-860 MHz, where the diplex filter is located approximately within the frequency range 188-238 MHz. This configuration is exemplary only and illustrates a more balanced frequency spectrum for down and up streams. Also, assume each down and up stream channel has a channel width of 6 MHz based on the existing cable plant in the United States. In the first embodiment described above where each modulator 122 modulates to approximately the same intermediate frequency, the first up converter 123-1 up converts by a carrier frequency of f.sub.0 MHz, the next up converter 123-2 up converts by a carrier frequency of $f_1=f_0+6$ Mhz, the next up converter 123-3 up converts by a carrier frequency of $f_2=f_1+6$ Mhz and so on, resulting in separate RF signals at channels of approximately 238-244 MHz, 244-250 MHz, 250-256 MHz, etc. In the second embodiment where each modulator 122-1, 122-2, 122-3, etc. modulates to different intermediate frequencies separated by a predetermined channel width, such as 6 MHz, then each of the up converters 123 up converts by approximately the same carrier frequency $f_C$ resulting in the separate RF signals at the assigned downstream channels of approximately 238-244 MHz, 244-250 MHz, 250-256 MHz, etc. Other systems are contemplated, such as a mid-split system in which the diplex filter is located approximately within the frequency range of 80-118 MHz, where each down and up stream channel has any convenient channel width.

In the communication system 100, a substantial portion or all of the available television broadcast spectrum is utilized to assign channels to each of the subscribers. In this embodiment, the relatively large bandwidth currently unavailable using conventional television broadcast networks (e.g., in the approximately 54-550 MHz range) is available for channel assignments rather than being allocated to broadcast content. This provides an advantage over prior art networks by allowing the use of a very clean portion of the RF spectrum (e.g., 50-300 MHz). Each user may be allocated a greater amount of bandwidth or a greater number of subscribers may be served for each coaxial cable. A different frequency spectrum split may be utilized to increase upstream bandwidth availability. Embodiments with a smaller geographic serving area 107 provide a reduced noise node so that each subscriber destination 109 receives a cleaner signal, typically without the need for amplification. As described further below, bandwidth allocation is controlled by a bandwidth manager 161 coupled to a port of the switch 119. The bandwidth manager 161 allocates each subscriber destination 109 unshared, bidirectional and deterministic bandwidth. In other words, as a subscriber selects to receive different data (e.g., a different television "channel"), the set top box 141 (or 153) sends a message to the bandwidth manager 161 via the switch 119, where the bandwidth manager 161 responds by directing a corresponding one of the RF modems 121 associated with the particular subscriber destination 109 to send a data signal with the requested data via the appropriate channel. The bandwidth manager 161 may be configured to control the RF modems 121 in-stream via the switch 119, or may be coupled directly to the RF modems 121 to facilitate dynamic bandwidth allocation, tuning, failure recovery, etc.

The communication system 100 is a fully switched hierarchy that provides composite bandwidth to make every requested data signal (requested from an subscriber destination 109) point-to-point (i.e., sent from the point of distribution 103 to a particular subscriber destination 109 rather than sending data signals in a broadcast or multicast fashion), regardless of how many requests for the same data signal exist on the communication system 100 at any one time. Thus, the data signals are targeted and intended for each of the subscriber set top boxes 141 are output from the point of distribution 103 of the network 100. A warp server 163, coupled to another port of the switch 119, is provided to cooperate with each of the gateways 139 to enforce and maintain point-to-point communications and to keep broadcast and/or multicast communications to a minimum.

In operation, there is available data in source 101 that a subscriber may want to receive. Specific requests for data are sent by a subscriber destination 109 (e.g., through the subscriber's gateway 139) and received by the switch 119 at the point of distribution 103 (i.e., at a corresponding RF modem 121), which forwards the request for the specified data to the bandwidth manager 161. Based on this subscriber-initiated request, the bandwidth manager 161 forwards the requests to the appropriate one of the servers 111-115. It is noted that the embodiment shown is exemplary only and that any other information may be supported with the appropriate communication equipment. The request typically includes an address or the like identifying a particular subscriber destination 109. The source 101 provides the subscriber-requested data to the requesting server 111-115, which forwards the information to the switch 119. The switch 119, in turn, forwards the data to the appropriate RF modem 121 for delivery to the requesting subscriber destination 109. The signal with the subscriber-requested data flows to the subscriber destination 109 in the manner previously described.

The bandwidth manager 161 receives subscriber requests for particular data from the node 105, initiates a request to have the subscriber-requested data sent to the requesting subscriber destination 109 and determines the subscriber request's effect on overall bandwidth availability at the subscriber's gateway 139. For example, if a subscriber requests a different regular analog television data signal (i.e., a subscriber request to receive channel 42 rather than channel 36 programming at a television set), the bandwidth manager 161 determines that the request has little or no effect on overall requested bandwidth and thus allows the requested data to be sent to the subscriber destination 109. If, however, the request is a change from a regular analog television data signal to a high definition television data signal, the bandwidth manager 161 determines whether sufficient bandwidth is available to respond to the request to that subscriber destination 109. If so, the bandwidth manager 161 approves the request and allows the requested data to be sent to the requesting subscriber destination 109. In a dynamic configuration, the bandwidth manager 161 allocates a greater amount of bandwidth to the subscriber destination 109 on a given RF modem 121, or switches to another RF modem 121 that is able to deliver the requested bandwidth. If the request cannot be granted or if sufficient bandwidth is not available, then the bandwidth manager 161 blocks the request from the subscriber or, alternatively, delivers the data with quality limitations. In either case, the bandwidth manager 161 sends a message to the subscriber destination 109 indicating insufficient bandwidth to accommodate the requested data.

In one embodiment, the bandwidth manager 161 monitors and stores allocated bandwidth usage by each of the subscriber devices 109 in the communication system 100. The bandwidth usage by each of the subscriber devices 109 is tracked and stored in the aggregate and further by specific service type. The bandwidth manager 161 may perform these monitoring functions by tracking packet transfers in the switch 119. In a more practical embodiment, the manager/control block 709 of each gateway 139 tracks bandwidth usage by the corresponding subscriber destination by service type (e.g., phone, video-on-demand, interne usage, etc.) and in the aggregate. Each gateway 139 reports bandwidth usage to the bandwidth manager for tracking purposes. In this manner, the bandwidth manager 161 tracks total bandwidth of the communication system 100, of each subscriber destination 109, and of each service consumed at each subscriber destination 109. Such bandwidth usage information is useful for many purposes, including billing services, network management and control, and further control of particular services provided to each subscriber destination 109 as desired. For example, the bandwidth manager 161 may be configured to receive a request from a particular subscriber destination 109 for a particular service, such as a video conference, a teleconference, a video-on-demand, etc., allocate bandwidth for the service, and track usage of the service for proper billing of the subscriber.

In any of the embodiments, the bandwidth manager 161 is configured to conduct and control dynamic tuning and bandwidth allocation capabilities. In this embodiment, the gateways 139 are configured to be dynamically tunable so that the bandwidth manager 161 distributes the assignment of the gateways 139 to the RF modems 121 in any desired manner. The bandwidth manager 161 dynamic tuning and re-allocation as desired or necessary by sending one or more channel switch commands to a corresponding one or more of the gateways 139 to re-assign the gateway(s) to another channel. As described previously, such dynamic tuning is advantageous for various reasons, including the ability to switch a gateway 139 to another RF modem 121 in the event of failure of an RF modem 121 or in the event of a change in bandwidth allocation and/or to increase available bandwidth utilization. For example, a subscriber destination 109 may request increased bandwidth that is not available from its current RF modem 121 that is also serving one or more additional subscriber destinations 109. The bandwidth manager 161 switches the corresponding gateway 139 to a different RF modem 121 that has sufficient bandwidth to handle the requested bandwidth. Also, one or more subscriber destinations 109 utilizing lower bandwidth may be moved or repositioned to free up one or more RF modems 121 to provide greater bandwidth to one or more other subscriber destinations 109. The channel switch command may further be employed to program a gateway 139 to tune to multiple consecutive channels if the corresponding subscriber destination 109 requests or otherwise needs a substantial bandwidth allocation.

The warp server 163 and the gateways 139 are configured to replace broadcast or multicast traffic in the communication system 100 with point-to-point traffic. An example of such a broadcast packet is an Address Resolution Protocol (ARP) request requesting the physical address of a computer, where the ARP request includes a logical address of the target computer. In a typical network configuration, ARP requests are broadcast to every other computer in the network. Upon receipt, all devices that do not have that logical/physical address ignore the request, while the computer with the specified logical/physical address responds with a directed packet so that the requesting computer can subsequently send directed data to that computer using the returned physical address. Broadcast and/or multicast traffic in the communication system 100 is not desired because it substantially increases overhead and threatens to consume valuable bandwidth that is preferably utilized to deliver content. Broadcast and multicast traffic is allowed from the point of distribution 103, but is either not allowed or otherwise substantially limited from the subscriber destinations 109. In the communication system 100, the warp server 163 maintains a database of addresses for each gateway 139 and other devices on the communication system 100. Each gateway 139 also includes additional functionality, such as programmed within manager/control block 709, that allows it to block broadcast packets from subscriber devices (143-151) or to convert broadcast packets to point-to-point ARP (address resolution protocol) requests so that point-to-point communication is enforced throughout the communication system 100.

For example, a computer 147-x sends out an ARP request to determine an address for another computer 147-y in the communication system 100, where "x" and "y" are used to distinguish between different computers within the geographic serving area 107. The gateway 139-x intercepts the broadcast ARP request from the computer 147-x, converts the ARP request to a warp request and sends the warp request in a point-to-point manner to the warp server 163. The manager/control block 709, for example, is programmed with this interception, conversion and forwarding capability. The warp request includes the information in the ARP request, including, for example, the request for the physical address of the computer 147-y to which the computer 147-x needs to send data. The warp server 163 contains a database linking physical and logical addresses of all devices in the communication system 100 and, upon receipt of the warp request, determines the physical address of the computer 147-y. The warp server 163 optionally sends a message to the computer 147-y identifying that data is coming from the computer 147-x and sends a message to the computer 147-x with the physical address of the computer 147-y so that the computer 147-x can send the data point-to-point. The computer 147-x sends a message to computer 147-y, where the message includes a source address identifying the computer 147-x. In this manner, communication between the computer 147-x and the computer 147-y becomes point-to-point. The warp server 163 serves this function to allow point-to-point communication between all devices in the communication system 100.

The warp server 163 may allow a limited amount of broadcast traffic initiated by the subscriber devices 109. For example, if an ARP request is received and the requested logical address is not found, then the warp server 163 may forward the request in broadcast format to each device in the communication system 100 in a similar manner as a normal ARP request. Such an unknown address request may occur, for example, if new and previously unknown devices are added to the network, such as a new subscriber destination 109 otherwise not known to the warp server 163. Alternatively, unknown ARP requests are systematically denied, where new devices are programmed to reduce or eliminate the possibility of unknown devices in the system. The warp server 163 tracks and terminates potential abuse of such broadcast traffic. For example, repeated ARP requests by a particular subscriber destination 109 are monitored and terminated to prevent abuse or attack that could otherwise consume valuable bandwidth or interrupt service to any other subscriber destination 109. Each gateway 139 serves to protect the communication system 100 and the network from abuses by any particular subscriber destination 109 or home networks.

One significant benefit of the communication system 100 shown is the ability to deliver allocated, unshared, bidirectional and deterministic bandwidth to individual subscribers. Thus, data destined for a particular subscriber destination 109 is assigned a specific and unshared bandwidth that is available only to that subscriber. This provides the ability to deliver time-dependent or isochronous type services to each subscriber destination 109, such as video, voice over IP, bidirectional audio content (e.g., a telephone connection), etc., that is not otherwise possible in a shared network. Downstream data entering the network passes though a switch, which forwards the data to a port of the switch based on the subscriber for which it is destined. Upstream or subscriber data is forwarded to a respective RF modem, which forwards packetized information to the switch. The switching equipment is much less expensive than the costly instruction-based equipment used in existing HFC networks.

The communication system 100 employs the entire television broadcast spectrum for point to point communications and generally does not forward broadcast communications to all of the subscriber destinations 109, as is typical for legacy cable television networks. Such configuration may not be suitable for consumer networks, for which the Federal Communications Commission (FCC) regulations may require plug and play broadcast television content. Thus, the communication system 100 is particularly advantageous for business use in which broadcast content is generally limited or not provided. In a limited business configuration, for example, one or more broadcast television stations may be available, such as a limited number of television channels directed towards education, local programming, weather, news, etc.

Figure 2:
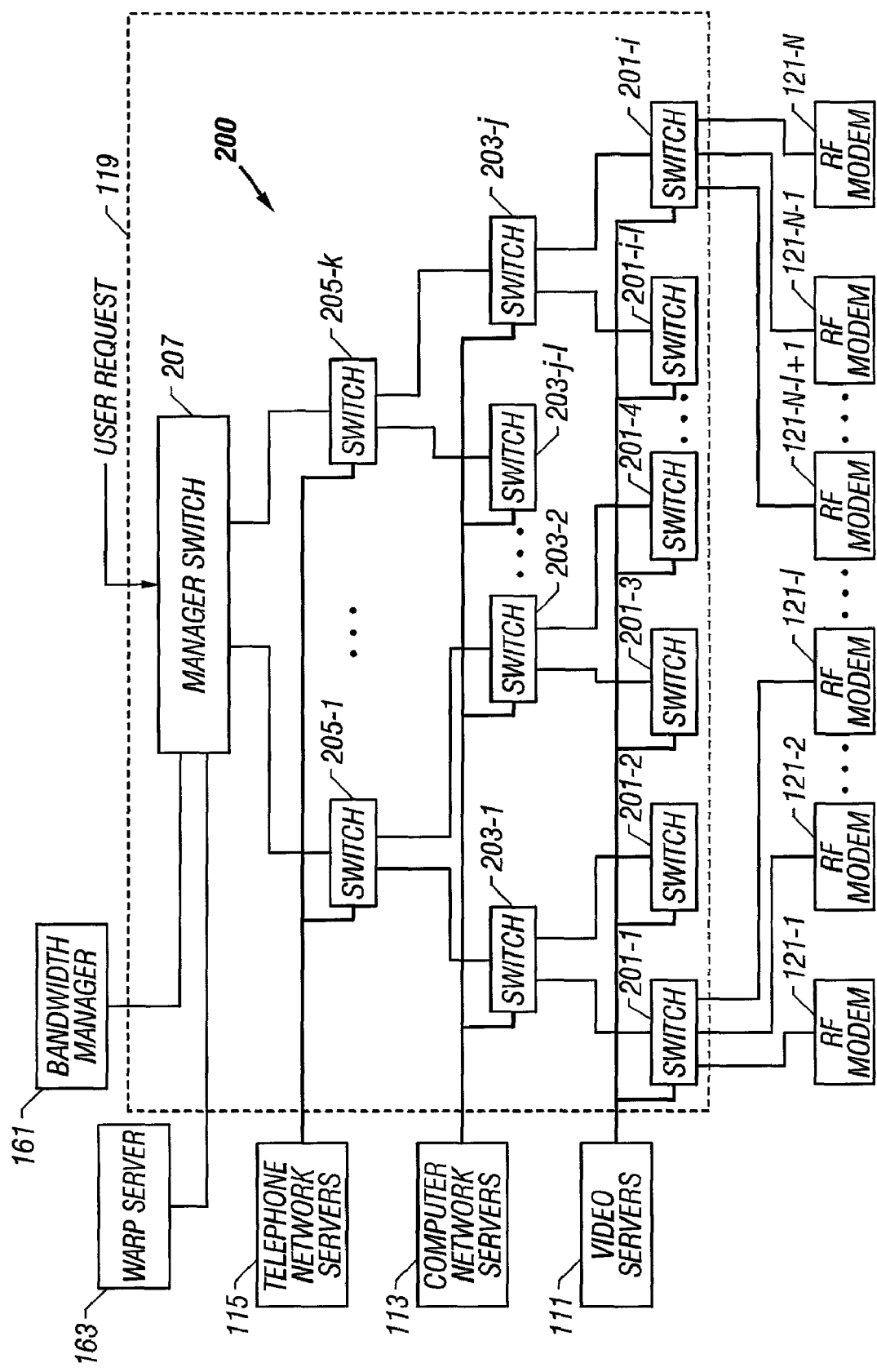
FIG. 2 is a simplified block diagram of an exemplary embodiment of a switch matrix that may be used in conjunction with the communication network embodiments described herein.

FIG. 2 is a simplified block diagram of an exemplary embodiment of the switch 119 a including a switch matrix 200 configured as a hierarchy of switches. The exemplary switch matrix 200 configuration includes multiple levels of switches, each level configured as an array of switches for forwarding data between the servers 111-115 and the RF modems 121. In particular, the matrix configuration includes a first array of switches 201-X coupled to the video servers 111, where "X" is a positive integer from 1 to "i" and where "i" is a positive integer. Each switch 201 is coupled to one or more of the RF modems 121 for forwarding video data between the video servers 111 and the subscriber destinations 109 associated with that particular RF modem 121. In the exemplary embodiment shown, for example, each switch 201 is coupled to a group of the RF modems 121, where each group includes "1" RF modems 121. In particular, the first RF modem 121-1 is coupled to a first group of RF modems 121-1 to 121-1 and so on up to a last switch 201-i coupled to a final group of RF modems 121-N-1+1 to 121-N. It is noted that the embodiment shown is exemplary only, so that the number "1" of RF modems 121 in each group and the number "i" of switches 201 are any appropriate numbers depending upon the data capacity of each switch 201 and bandwidth requirements of the associated subscriber destinations 109. Also, the number of RF modems 121 in each group need not be equal and may vary from group to group.

The matrix configuration further includes a second array of switches 203-X coupled to the computer network servers 113, where "X" is a positive integer from 1 to and where "j" is a positive integer. Each switch 203 is coupled to one or more of the switches 201 for forwarding computer network data between the computer network servers 113 and the subscriber destinations 109 associated with RF modems 121 that are further coupled to that particular switch 203 via the intermediate switches 201. In the exemplary embodiment shown, for example, each switch 203 is coupled to two of the switches 201. In particular, the first switch 203-1 is coupled to the first two switches 201-1 and 201-2, the next switch 203-2 is coupled to the next two switches 201-3 and 201-4 and so on up to the last switch 203-$j$ coupled to the last two switches 201-$i$-1 to 201-$i$. Again, the embodiment shown is exemplary only, so that the number of switches 201 coupled to each switch 203 and the number "j" of switches 203 are any appropriate numbers depending upon the respective data capacities of the switches 201, 203 and bandwidth requirements of the associated subscriber destinations 109.

The matrix configuration further includes a third array of switches 205-X coupled to the telephone network servers 115, where "X" is a positive integer from 1 to "k" and where "k" is a positive integer. Each switch 205 is coupled to one or more of the switches 203 for forwarding computer network data between the telephone network servers 115 and the subscriber destinations 109 associated with RF modems 121 that are further coupled to that particular switch 205 via the intermediate switches 201, 203. In the exemplary embodiment shown, for example, each switch 205 is coupled to two of the switches 203. In particular, the first switch 205-1 is coupled to the first two switches 203-1 and 203-2 and so on up to the last switch 203-$k$ coupled to the last two switches 203-$j$-1 to 203-$j$. Again, the embodiment shown is exemplary only, so that the number of switches 203 coupled to each switch 205 and the number "k" of switches 205 are any appropriate numbers depending upon the respective data capacities of the switches 203, 205 and bandwidth requirements of the associated subscriber destinations 109.

In one embodiment, the switch matrix 200 is configured into a "top-down" or pyramid configuration and organized to handle different levels of bandwidth at each level. For example, the number of switches in each array may be such that $i>j>k$, so that the number of switches is increased from the top to the bottom of the pyramid. A greater number of the switches 201 are provided at the base of the pyramid to effectively handle a higher overall bandwidth. A medium number of the switches 203 are provided in the middle of the pyramid to handle a medium amount of bandwidth. A reduced number of the switches 205 are provided at the top of the pyramid to handle a lower amount of bandwidth. As shown, the switches 201 coupled to the video servers 111 handle video data, which typically consumes a greater amount of bandwidth. Computer network data, which consumes a moderate amount of bandwidth and which may include significant upstream traffic, is processed via the switches 203 coupled to the computer network servers 113. Telephonic data is handled through the switches 205 coupled to the telephone servers 111.

Each switch 201 handles the data of each of the servers 111-115 for the particular subscriber destinations 109 in the corresponding group of RF modems. In the particular embodiment shown, for example, the switch 201-1 handles video, computer and telephonic data for the subscriber destinations 109 associated with the first group of "1" RF modems 121-1 to 121-1. The next switch 201-2 handles data for the subscriber destinations 109 associated with the next group of "r" RF modems 121, and so on. The switch 203-1 handles computer and telephonic data for the subscriber destinations 109 associated with the RF modems 121 coupled through the switches 201-1 and 201-2. The next switch 203-2 handles computer and telephonic data for the subscriber destinations 109 associated with the RF modems 121 coupled through the switches 201-3 and 201-4, and so on. It is appreciated that each of the switches 201 effectively isolates video data from being forwarded to the upper level switches 203, 205. In a similar manner, the switch 205-1 handles telephonic data for the subscriber destinations 109 associated with the RF modems 121 coupled through the switches 203-1 and 203-2. The next switch 205-2 (not shown) handles computer and telephonic data for the subscriber destinations 109 associated with the RF modems 121 coupled through the switches 203-3 and 203-4 (not shown), and so on. Again, each of the switches 203 effectively isolates computer network data from being forwarded to the upper level switches 205. Although the servers 111-115 may be coupled to the respective switch arrays 201, 203 and 205 through single buses or connections, greater throughput is achieved with separate connections to each switch, such as in a star configuration or the like. Thus, video data from a video server 111 intended for a subscriber destination 109 coupled through the RF modem 121-1, for example, is sent to switch 201-1 and not to any of the other switches 201.

A manager switch 207 is provided in the switch matrix 200 and coupled to each of the switches 205. The manager switch 207 includes additional ports for further coupling the bandwidth manager 161 and the warp server 163. Other than handling management information and traffic to and from the bandwidth manager 161 and the warp server 163, the manager switch 207 also handles subscriber to subscriber traffic. For example, the data for a cross POD video conference between two different subscriber destinations 109 or a phone call travels to and from the manager switch 207 in the switch matrix 200. It is appreciated that two-way communication is fully enabled in the switch matrix 200. In this manner, the manager switch 207 is able to communicate with each of the switches 201-205 in the switch matrix 200 via the switches 205, and vice versa. Further, the manager switch 207 communicates with each of the subscriber destinations 109 via corresponding RF modems 121, and vice versa. Likewise, the bandwidth manager 161 and the warp server 163 communicate with any device in the communication system 100 via the manager switch 207. Each of the switches 201-207 of the switch 119 may be implemented using the same type of switch, or may be implemented as different switch types that are tuned or selected based on the type of data or the bandwidth requirements associated with that switch or that level. Also, although only three levels of switch arrays are shown, it is understood that any number of arrays may be implemented depending upon the particular network configuration and operation.

The bandwidth manager 161, in combination with the switch matrix 200, provides "statistically starved" capabilities. The statistically starved feature allows the switch matrix 200 to be built with less than the maximum bandwidth that would theoretically be needed if all subscriber destinations 109 were using all services available over the communication system 100 simultaneously. In order to provide a statistically-starved switching capability, the switch matrix 200 is designed so that it is always operating significantly below its maximum bandwidth capacity. The bandwidth manager 161 monitors the operation of the switch matrix 200 to determine the appropriate allocation of each switch within the switch matrix 200 based on requests for data being processed from subscriber destinations 109. In one embodiment, the bandwidth manager 161 monitors the bandwidth usage at every individual switch including the manager switch 207, the audio switches 205, the computer network switches 203 and the video switches 201 of the switch matrix 200 and at each gateway 139 of geographic serving area 107. The bandwidth manager 161 may also monitor the bottom layer, or the switches 201, to determine how much data is going to each subscriber destination 109.

In an alternative embodiment, the switches 201, 203 and 205 are coupled with redundant pathways as controlled by the bandwidth manager 161. If a particular component switch within the switch matrix 200, for example the video switch 201-1, reaches its bandwidth capacity, and if another video signal needs to be routed to the RF modem 121-2, rather than routing the additional video signal through the video switch 201-1, the bandwidth manager 161 re-routes the additional video signal through another video switch, such as the video switch 201-2, to the RF modem 121-2. Any number of routing algorithms may be used to perform the routing function to avoid dropping of data packets at any particular switch within the switch matrix 200.

It should be understood that different types of data could arrive at a single level within the switch matrix 200. The switch matrix 200 does not necessarily have to be designed to accept a particular type of data at each level, but rather to accept a particular level of bandwidth of data at each level, where the highest bandwidth data is accepted at the lowest level, an intermediate bandwidth data at an intermediate level, and a lower bandwidth data at a higher level. This serves to keep the switch matrix 200 from being congested with data packets because the highest bandwidth services only utilize the lower levels of the switch matrix 200. It is further noted that while the switch matrix 200 has been shown with four levels, any number of levels may be used to accommodate different types, amounts and bandwidth of data. The incoming data is routed through the switch matrix 200 according to actual bandwidth, actual usage at the particular switch and anticipated usage.

Figure 3:
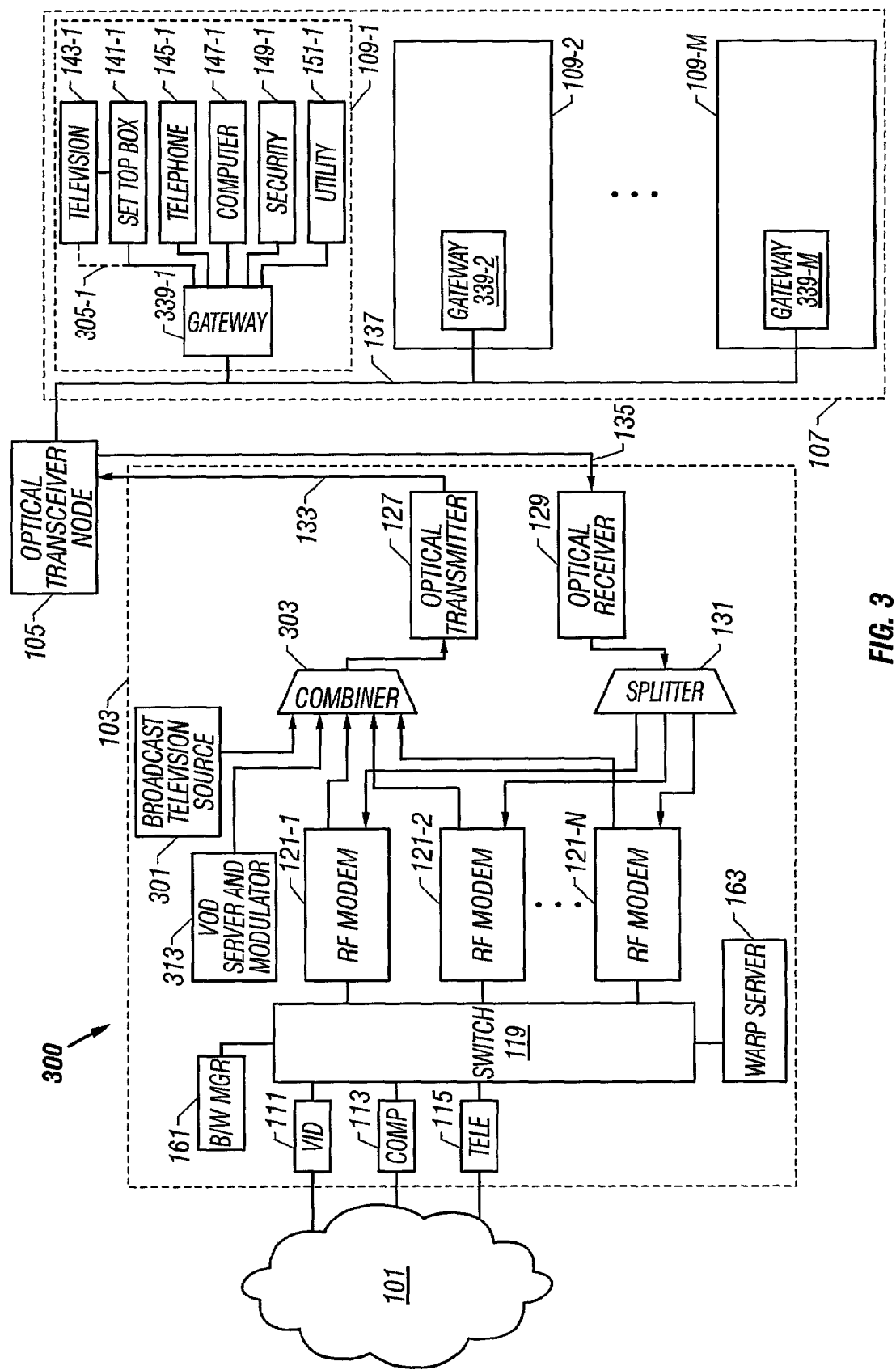
FIG. 3 is a block diagram of a communication network that is similar to the communication network of FIG. 1 except employing a different allocation of the television broadcast spectrum and assigned channels.

FIG. 3 is a block diagram of a communication network 300, which is similar to the communication system 100 except that it employs a different allocation of the television broadcast spectrum and assigned channels. In the communication network 300, broadcast television channels are allocated to a particular frequency range of the overall television broadcast spectrum. The remaining portion of the television broadcast spectrum is utilized to assign data channels including any combination of downstream and upstream channels. In an exemplary embodiment in which the usable television broadcast spectrum is 5-860 MHz, the frequency range of approximately 54 to 550 MHz is allocated to broadcast television channels. The remaining spectrum, including frequency ranges 5 to 42 MHz and 550 to 860 MHz are allocated to subscriber channels for dedicated bandwidth to each subscriber destination 109. In a more particular embodiment, the frequency range 550 to 860 MHz is allocated for downstream channels and the frequency range 5 to 42 MHz is allocated for upstream channels. The frequency range 42-54 MHz is the location of the diplex filter. It is understood, however, that the particular frequency ranges are exemplary only and that any frequency allocation scheme may be employed depending upon the desired configuration.

As shown in FIG. 3, the switch 119 communicates with the respective RF modems 121 in a similar manner previously described. The RF modems 121 provide their outputs to respective inputs of a combiner 303 of the point of distribution 103, where the combiner 303 operates in a similar manner as the combiner 125. In this embodiment, however, the output of a broadcast television server 301 is provided to another input of the combiner 303. The broadcast television server 301 may be part of the source 101 or is a server within the point of distribution 103 that receives and forwards broadcast television information. The combiner 303 is configured to receive and combine the broadcast television information from the broadcast television server 301 with the source information forwarded within assigned channels from the RF modems 121. In particular, the combiner 303 operates to overlay the broadcast television channels with the channels of the RF modems 121 to develop a combined electronic signal provided to the optical transmitter 127. The optical transmitter 127 and the node 105 generally operate in a similar manner as previously described, so that the combined overlaid spectrum is asserted onto the coaxial cable 137 to each of the subscriber destinations 109.

Each subscriber destination 109 includes a corresponding gateway 339 that is similar in operation to each gateway 139 and tuned to a downstream channel for the corresponding subscriber destination 109 to retrieve source information. The source information in the downstream channel, however, does not need to include any of the broadcast television information that would otherwise be requested and sent to a set top box 141 in the communication system 100 via a corresponding RF channel. Instead, for the communication network 300, each gateway 339 receives the broadcast television information and additionally operates as a splitter to split off the broadcast television information from the combined signal and to forward the broadcast television information to the set top box 141.

The broadcast television information may be in either analog or digital format depending upon the particular configuration. If the broadcast television information is in analog format, then an optional cable or link 305-1 within the subscriber destination 109-1 illustrates an alternative embodiment in which the analog television signals split from the assigned channels by the gateway 339-1 may be provided directly to the television 143-1 rather than via the set top box 141-1. For digital broadcast television information, however, the set top box 141-1 is utilized to convert the digital information to the appropriate analog format for consumption by the television 143-1.

The communication network 300 may include the VID servers 111 for sending video-on-demand information to any one or more of the subscriber destinations via corresponding channels in a similar manner as previously described. The video on demand information, however, may consume a significant amount of bandwidth thereby reducing the available bandwidth to other subscriber devices, such as a corresponding computer 147. In another alternative embodiment, a VOD and modulator server 313 is provided that asserts its output to another input of the combiner 303. The VOD server and modulator 313 operate to transmit video-on-demand information within the television broadcast information frequency range or within an adjacent channel. Although any downstream channel may be utilized for this purpose, each gateway 339 is configured to receive and forward the video on demand information to the corresponding set top box 141 for ultimate delivery to the corresponding television 143. In this manner, a selected channel within or adjacent to the television broadcast information is particularly convenient for reception by each gateway 339.

Figure 8:
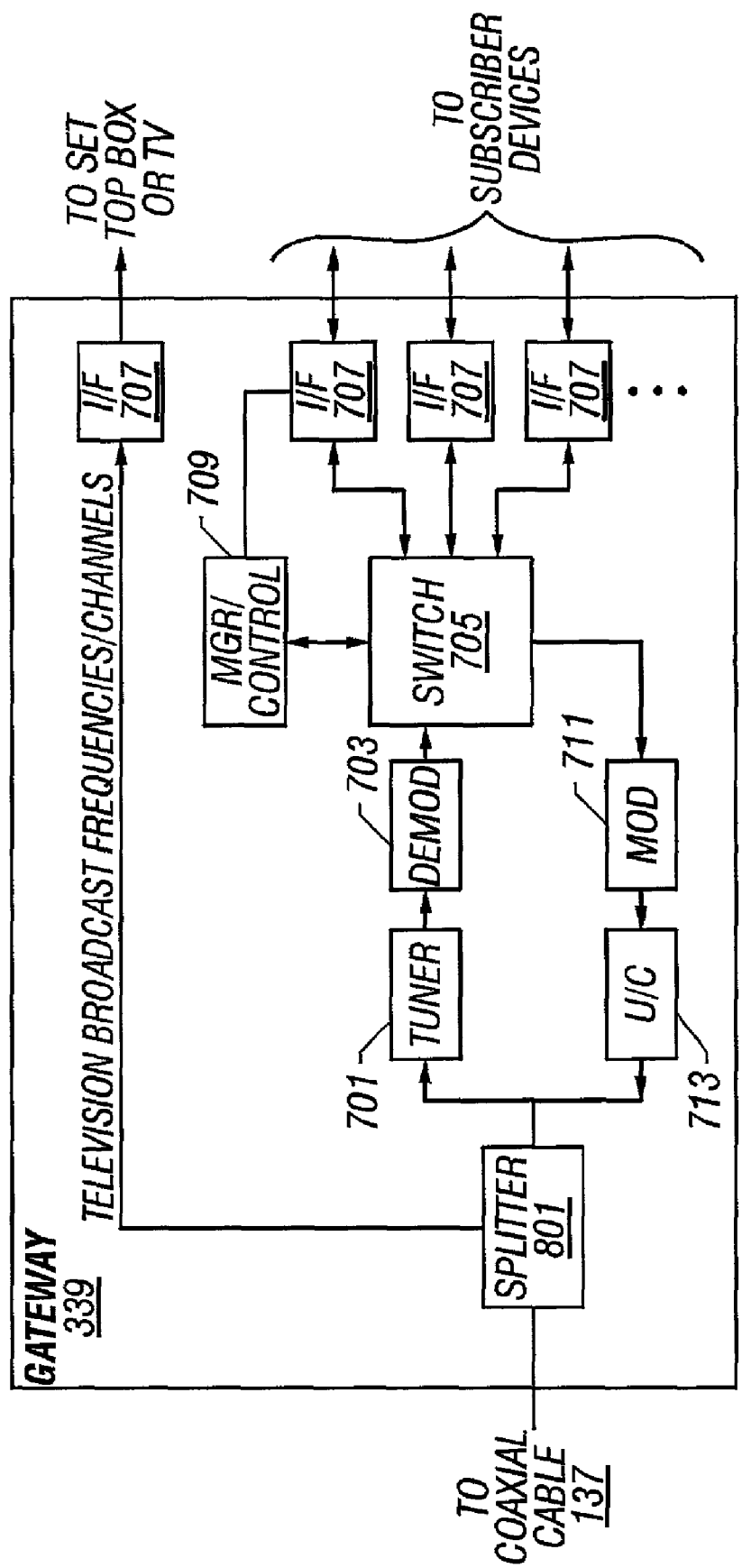
FIG. 8 is a block diagram of an exemplary embodiment of the gateways of FIG. 3 including a splitter for filtering television broadcast information.

FIG. 8 is a block diagram of an exemplary embodiment of each gateway 339 including a splitter 801 for filtering television broadcast information. The splitter 801 filters the television broadcast information from the broadcast television source 301 and provides the broadcast information to the local set top box 141 or television 143 via an optional interface module 707.

The communication system 300 is particularly applicable to consumer-based networks in which it is desirable that cable television channels be available directly from the coaxial cable 137 to the television 143 and/or the set top box 141 via a splitter or the like without the need for further conversion. Also, any one or more of the subscriber destinations 109 need not be equipped with a gateway 339 as long as an appropriate splitter is used to filter the television broadcast content from the packetized data channels. If a gateway 339 is not provided at a subscriber destination 109, however, then it is desirable to either prevent upstream communications from that subscriber destination 109 or to otherwise restrict such upstream communications to reduce or eliminate the potential for broadcast information. For example, if a limited amount of upstream communications is desired, such as video-on-demand requests or the like from a corresponding set top box 141, then the set top box 141 is either equipped with a limited amount of transmit capability or gateway functions are incorporated into the set top box 141.

Figure 4:
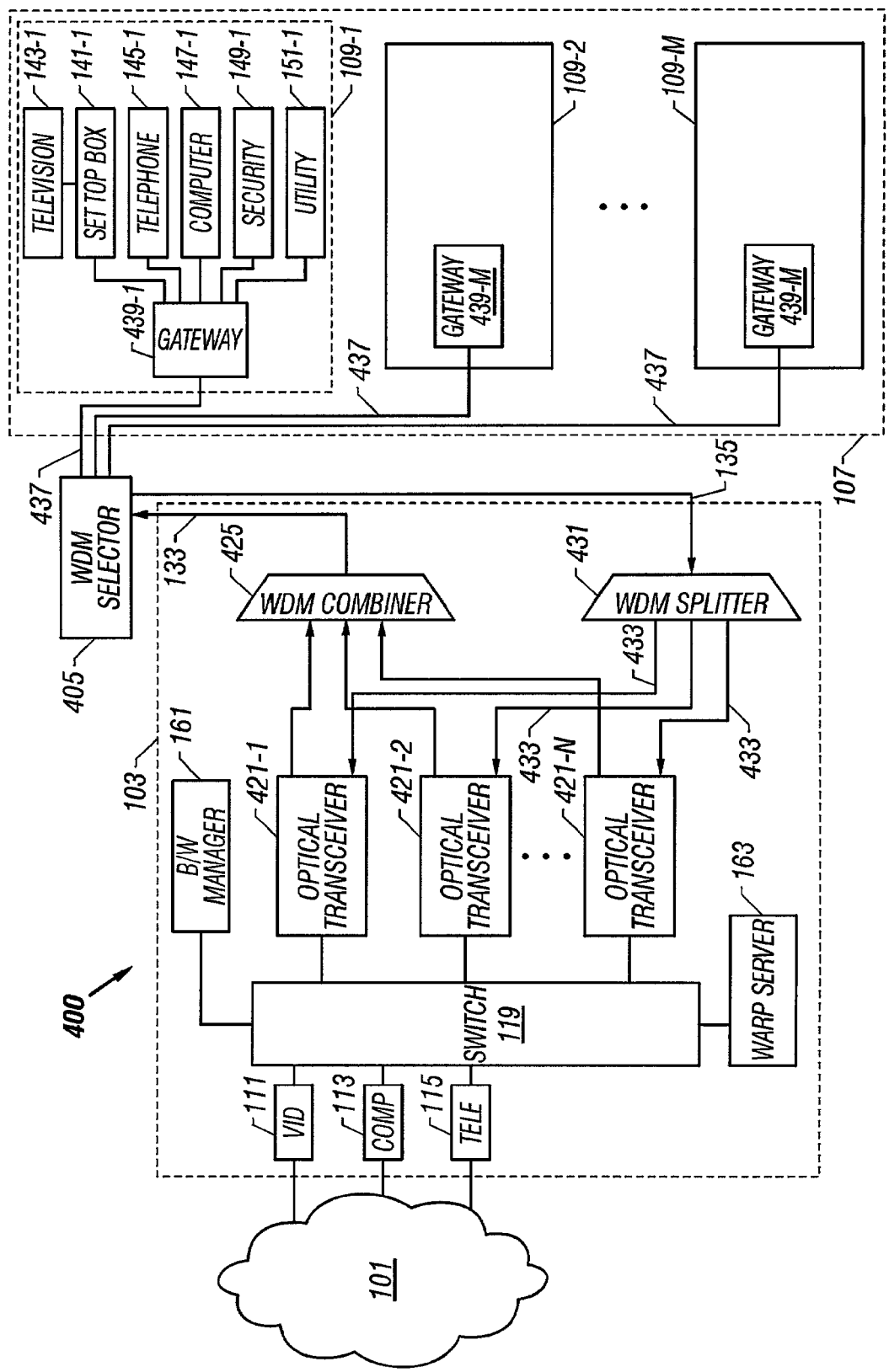
FIG. 4 is a block diagram of a communication network 400 that is similar in function to either of the communication networks of FIGS. 1 and 3 except employing an optical transmission pathway.

FIG. 4 is a block diagram of a communication network 400 that is similar in function to either of the communication networks 100, 300 previously described except employing an optical transmission pathway. The communication network 400 includes the switch 119, the bandwidth manager 161 and the warp server 163. Each RF modem 121 is replaced by an optical transceiver 421 (individually referenced as 421-X, again where "X" is a positive integer from 1 to N), where each optical transceiver 421 includes an optical transmitter and an optical receiver (not shown). Each optical transceiver 421 communicates with the switch 119 in a similar manner as the RF modems 121. Each optical transceiver 421 converts data packets received from the switch 119 into an optical signal and provides the optical signal to a Wavelength Division Multiplexing (WDM) combiner 425. The WDM combiner 425 replaces the combiner 125 and the optical transmitter 127. A WDM splitter 431 replaces the splitter 131 and the optical receiver 129. Outside the point of distribution 103, the node 105 is replaced with a WDM selector 405. The coaxial cable 137 is replaced with individual fiber optic cables 437 separately routed to each subscriber destination 109. Each of the subscriber destinations 109 includes an optical gateway 439 (individually referenced as 439-X, again where "X" is a positive integer from 1 to N) that interfaces a corresponding fiber optic cable. Each subscriber destination 109 includes the same or similar subscriber devices 141-151 previously described, where each optical gateway 439 communicates to each of the subscriber devices 141-151 in a similar manner. The communication network 400 provides a benefit of higher bandwidth capabilities as compared to HFC embodiments.

Each optical transceiver 421 converts forwarded packet data to an optical signal, which is provided to a respective input of the WDM combiner 425. The WDM combiner 425 optically multiplexes optical signals from each of the optical transceivers 421 and provides a combined optical signal. The combined optical signal is transmitted by the WDM combiner 425 via the optical cable 133 to the WDM selector 405. The WDM selector 405 receives and separates the combined optical signal into its individual optical signal components, and forwards separate optical signals over the appropriate optical fiber 437 to a corresponding one of the subscriber destinations 109. Each optical gateway 439 includes an optical transceiver that receives and converts an optical signal to an electrical signal for consumption by the various subscriber devices in a similar manner previously described. Each optical gateway 439 perform similar functions as the gateways 139, 339 previously described employing optical communications format.

Data packets originating from a subscriber destination 109 are converted to optical signals by a respective gateway 439 and sent to the WDM selector 405 over a corresponding fiber optic cable 437. The fiber optic cables 437 may comprise separate fiber optic cables including an upstream and a downstream cable. Each optical gateway 439 is associated with one of the optical transceivers 421, so that the communication between the optical gateway 439 and the central location 403 is point-to-point along a particular assigned channel. The WDM selector 405 receives and combines one or more optical signals, and sends a combined optical signal over the fiber optic cable 135 to the WDM splitter 431 at the point of distribution 103. The WDM splitter 431 receives the combined optical signal, splits the combined signal into its individual components and forwards them over separate fiber optic cables 433 to corresponding optical transceivers 421. Each optical transceiver 421 receives a corresponding optical signal, converts it to data packets in an electric signal format, and forwards the subscriber data to the switch 119.

Figure 5:
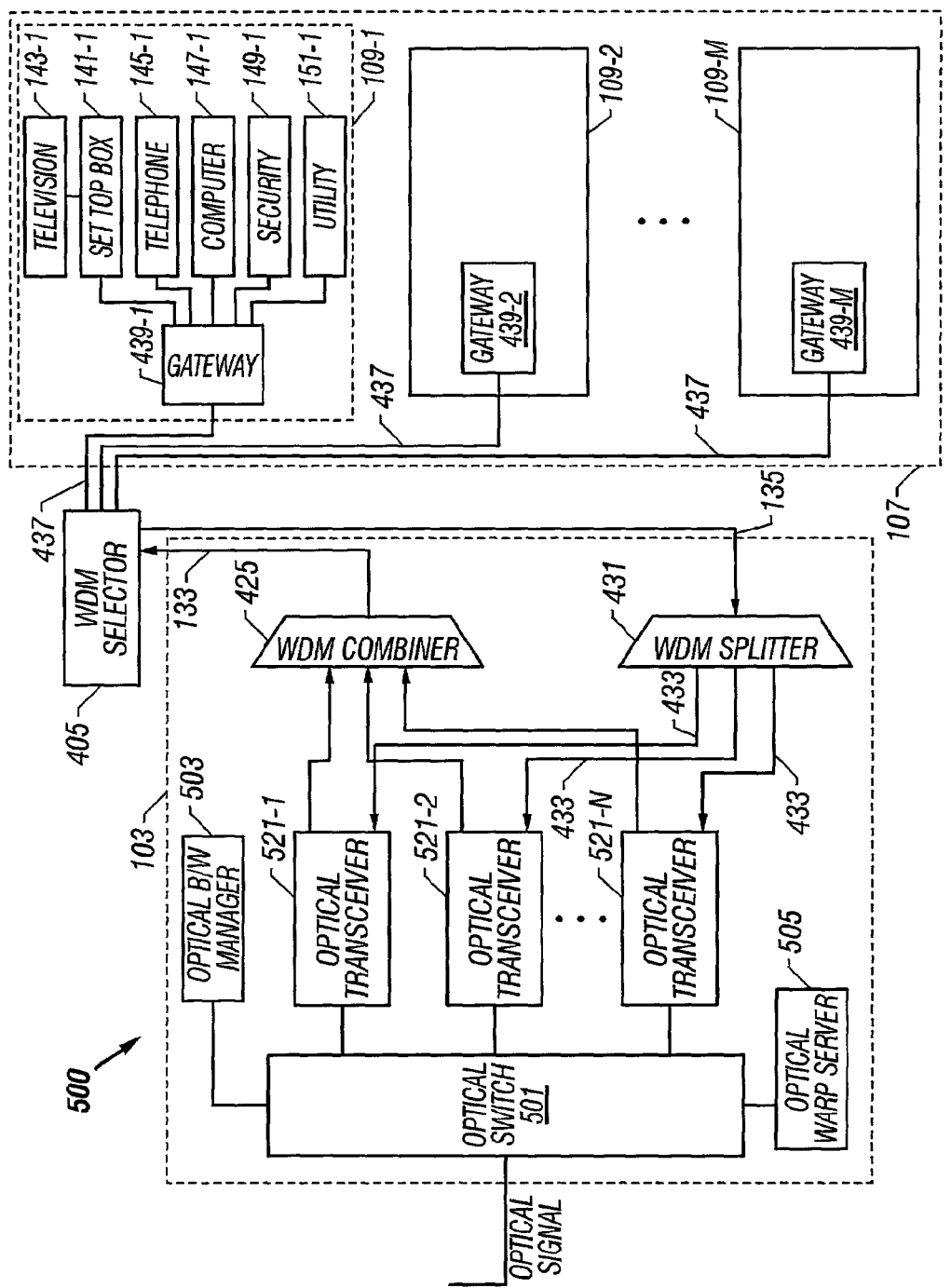
FIG. 5 is a block diagram of communication network of FIG. 4 including an optical switch.

FIG. 5 is a block diagram of a communication network 500 that is similar to the communication network 400 except that the switch 119 is replaced with an optical switch 501 and the optical transceivers 421 are replaced with optical transceivers 521 that are configured to communicate with the optical switch 501 via optical node connections. The optical switch 501 communicates with source servers (not shown) or the source 101 via optical signals, so that the servers are configured to support optical communications. The optical switch 501 is coupled to a bandwidth manager 503 and a warp server 505, which are optical versions of the bandwidth manager 161 and the warp server 163, respectively. Functional operation is similar.

Although the present invention has been described in detail, it should be understood that various changes, substitutions and alterations can be made hereto without departing from the spirit and scope of the invention as described by the appended claims.

What is claimed is:

1. A method of distributing information by a point of distribution to subscribers via a communication network, comprising:

dividing a television broadcast spectrum into a plurality of subscriber channels, each subscriber channel having a deterministic bandwidth for transmitting packetized information, the bandwidth subdivided into a plurality of unshared bandwidth allocations;

assigning each of a plurality of subscriber destinations to one of the subscriber channels;

allocating one of the unshared bandwidth allocations associated with one of the subscriber channels to each subscriber destination, wherein only the each subscriber destination utilizes its allocated unshared bandwidth; and forwarding by the point of distribution source information in packetized format to each subscriber destination based on assigned subscriber channels.

2. The method of claim 1, further comprising:

the forwarding comprising:

modulating source information for each subscriber channel;

up converting modulated source information into a corresponding one of the subscriber channels;

combining modulated source information from each subscriber channel into a combined signal; and distributing the combined signal to the plurality of subscriber destinations via the communication network.

3. The method of claim 2, further comprising:

the distributing comprising:

converting the combined signal into an optical signal; and transmitting the optical signal on an optical plant to an optical transceiver node.

4. The method of claim 3, further comprising:
the distributing further comprising:
converting, by the optical transceiver node, the optical signal into a combined electrical signal; and
transmitting, by the optical transceiver node, the combined electrical signal via a coaxial cable to each of the plurality of subscriber destinations.

5. The method of claim 2, further comprising:
the distributing comprising:
extracting, by a gateway device at a subscriber destination, modulated source information from an assigned channel of the combined signal;
demodulating, by the gateway device, forwarded source information from the extracted modulated information; an
forwarding, by the gateway device, demodulated source information to an addressed subscriber device at the subscriber destination.

6. The method of claim 5, prior to forwarding demodulated source information, further comprising:
converting, by the gateway device, demodulated forwarded source information into a format appropriate for the addressed subscriber device.

7. The method of claim 1, further comprising:
dividing the television broadcast spectrum into an upstream portion and a downstream portion; and
allocating each subscriber destination an unshared downstream bandwidth and an unshared upstream bandwidth.

8. The method of claim 7, wherein each subscriber channel includes a downstream subscriber channel in the downstream portion and an upstream subscriber channel in the upstream portion.

9. The method of claim 7, further comprising:
allocating broadcast television channels within a predetermined frequency range of the television broadcast spectrum;
dividing the plurality of subscriber channels into a remaining portion of the television broadcast spectrum outside the predetermined frequency range allocated to the broadcast television channels; and
combining the broadcast television channels into the combined signal.

10. The method of claim 9, further comprising:
allocating a first portion of the remaining portion of the television broadcast spectrum to downstream subscriber channels; and
allocating a second portion of the remaining portion of the television broadcast spectrum to upstream subscriber channels.

11. The method of claim 1, further comprising:
receiving source information from a plurality of content servers in the form of data packets; and
the forwarding comprising forwarding the received source information based on address information within the data packets.

12. The method of claim 1, further comprising:
tracking actual bandwidth usage of each subscriber destination.

13. The method of claim 1, further comprising:
receiving a combined upstream signal from the communication network;
splitting the combined upstream signal into multiple streams of subscriber information;
providing each stream of subscriber information to a corresponding one of a plurality of tuners, each tuner tuned to a corresponding subscriber channel;
extracting, by each tuner, a corresponding return RF signal;
demodulating a return RF signal into packetized subscriber information; and
forwarding the packetized subscriber information.

14. The method of claim 13, further comprising:
the receiving comprising receiving an optical signal; and
prior to splitting the combined upstream signal, converting the optical signal into the combined upstream signal.

15. The method of claim 1, further comprising:
detecting a request by a subscriber destination for increased bandwidth; and
increasing the allocated unshared bandwidth to the subscriber destination in accordance with the increased bandwidth request.

16. The method of claim 1, further comprising:
detecting a request by a subscriber destination for a service that would require a greater amount of bandwidth than currently allocated to the requesting subscriber destination; and
increasing the allocated unshared bandwidth to the requesting subscriber destination to handle the requested service.

17. The method of claim 1, further comprising:
receiving a physical address request from a subscriber destination;
retrieving the requested physical address from a stored address database; and
forwarding the retrieved physical address to the requesting subscriber destination.

18. The method of claim 1, further comprising:
modulating, by a gateway device at a subscriber destination, subscriber information from a subscriber device;
up converting, by the gateway device, the modulated subscriber information to a radio frequency (RF) signal into an assigned subscriber channel; and
transmitting, by the gateway device, the subscriber RF signal to an optical transceiver node via the coaxial cable.

19. The method of claim 1, further comprising:
sending, by a bandwidth manager at the point of distribution, a channel switch command to a gateway device at a subscriber destination; and
switching, by the gateway device, from an assigned channel to another channel in response to the channel switch command.

20. A communication system for distributing information via a network to a plurality of subscriber destinations, comprising:
a switch that forwards source information for each subscriber destination to a corresponding one of a plurality of ports of the switch based on address information;
a plurality of radio frequency (RF) modems, each RF modem coupled to one of the plurality of ports of the switch, and each RF modem operable to modulate and up convert information received from a respective switch port to an RF signal within a respective one of a plurality of subscriber channels of a television broadcast spectrum;
each of the plurality of subscriber channels being subdivided into a plurality of unshared bandwidth allocations, each subscriber destination being allocated one of the plurality of unshared bandwidth allocations associated with one of the subscriber channels, wherein only the each subscriber destination utilizes its allocated unshared bandwidth;

a combiner, coupled to the RF modems, that combines modulated information from each RF modem into a combined signal; and a transmitter, coupled to the combiner, that transmits the combined signal to the plurality of subscriber destinations via the network.

* * * * *

UNITED STATES PATENT AND TRADEMARK OFFICE
CERTIFICATE OF CORRECTION

| | | |
|---|---|---|
| PATENT NO. | : 8,141,121 B2 | Page 1 of 1 |
| APPLICATION NO. | : 12/724373 | |
| DATED | : March 20, 2012 | |
| INVENTOR(S) | : David M. Pangrac, Donald T. Gall and Steven W. Rose | |

It is certified that error appears in the above-identified patent and that said Letters Patent is hereby corrected as shown below:

Title Page, Item (76) Inventors: "Donald T. Gell" should read "Donald T. Gall".

Signed and Sealed this
Fifth Day of February, 2013

Teresa Stanek Rea
*Acting Director of the United States Patent and Trademark Office*